(12) United States Patent
Wittke

(10) Patent No.: US 10,509,836 B2
(45) Date of Patent: Dec. 17, 2019

(54) SYSTEMS AND METHODS FOR PRESENTING SEARCH RESULTS FROM MULTIPLE SOURCES

(71) Applicant: Rovi Guides, Inc., San Carlos, CA (US)

(72) Inventor: David Gerald Wittke, Simi Valley, CA (US)

(73) Assignee: Rovi Guides, Inc., San Jose, CA (US)

( * ) Notice: Subject to any disclaimer, the term of this patent is extended or adjusted under 35 U.S.C. 154(b) by 206 days.

(21) Appl. No.: 15/491,382

(22) Filed: Apr. 19, 2017

(65) Prior Publication Data

US 2018/0307760 A1    Oct. 25, 2018

(51) Int. Cl.
*G06F 16/9535* (2019.01)
*G06F 16/9038* (2019.01)

(52) U.S. Cl.
CPC ...... *G06F 16/9535* (2019.01); *G06F 16/9038* (2019.01)

(58) Field of Classification Search
CPC ............ G06F 16/9535; G06F 16/9038; G06F 17/30038; G06F 17/30867; G06F 17/30991; G06F 16/48
See application file for complete search history.

(56) References Cited

U.S. PATENT DOCUMENTS

| | | | |
|---|---|---|---|
| 6,999,959 B1* | 2/2006 | Lawrence | G06F 17/30864 |
| 8,386,469 B2* | 2/2013 | Reuther | G06F 17/30427 |
| | | | 707/713 |
| 8,577,915 B2 | 11/2013 | Barve et al. | |
| 8,661,033 B2 | 2/2014 | Leppert et al. | |
| 8,706,756 B2 | 4/2014 | Wu et al. | |
| 9,477,713 B2* | 10/2016 | Alvino | G06F 17/3053 |
| 9,854,309 B2* | 12/2017 | Odryna | H04N 21/4622 |
| 2007/0061301 A1* | 3/2007 | Ramer | G06Q 30/0247 |
| 2007/0266001 A1* | 11/2007 | Williams | G06F 17/3005 |
| 2010/0153885 A1 | 6/2010 | Yates | |
| 2010/0199219 A1* | 8/2010 | Poniatowski | G06F 3/0482 |
| | | | 715/825 |
| 2011/0161242 A1* | 6/2011 | Chung | G06Q 30/00 |
| | | | 705/347 |
| 2011/0283325 A1* | 11/2011 | Tomita | H04N 5/44543 |
| | | | 725/61 |
| 2013/0268522 A1 | 10/2013 | Barrett | |

(Continued)

OTHER PUBLICATIONS

International Search Report and Written Opinion dated Jul. 9, 2018 in PCT/US2018/028060.

*Primary Examiner* — Robert W Beausoliel, Jr.
*Assistant Examiner* — Arthur Ganger
(74) *Attorney, Agent, or Firm* — Haley Guiliano LLP

(57) ABSTRACT

Systems and methods for presenting search results from multiple sources by ranking sources that results are received from and not presenting duplicate results from lower ranked sources. For example, results from a first source and a second source may be received. The results from the first source may be presented in a row closer to the top of a screen than the results from the second source in response to the user having a preference for the first source over the second source. If the two results match, the result is only displayed in the row for the higher ranked source and another result is presented in the second row that does not match any of the displayed results in the first row.

20 Claims, 10 Drawing Sheets

(56) References Cited

U.S. PATENT DOCUMENTS

| | | | |
|---|---|---|---|
| 2014/0006423 A1* | 1/2014 | Melnychenko | G06F 17/3053 |
| | | | 707/749 |
| 2014/0052453 A1 | 2/2014 | Koivuniemi et al. | |
| 2014/0208360 A1* | 7/2014 | Kardatzke | H04N 21/482 |
| | | | 725/48 |
| 2015/0074599 A1* | 3/2015 | Stein | G06F 3/0482 |
| | | | 715/810 |
| 2015/0120722 A1* | 4/2015 | Mart N Mart Nez | |
| | | | G06F 16/9535 |
| | | | 707/733 |
| 2017/0068670 A1* | 3/2017 | Orr | G06F 17/30038 |

\* cited by examiner

SYSTEMS AND METHODS FOR PRESENTING SEARCH RESULTS FROM MULTIPLE SOURCES

BACKGROUND

Given the plethora of media content sources, each with a large amount of available media content, users often find it difficult to wade through a large number of search results for a given query. Specifically, universal search features have enabled users to obtain results from many different content sources with a single search, but the sheer number of results may be overwhelming some conventional systems attempt to overcome this by organizing results by the source from which they are received when presenting the results to a user. However, many identical media content are available from different sources and may be presented multiple times, which may lead to results that a user may be interested in getting buried below them.

SUMMARY

Accordingly, systems and methods are described herein for presenting search results from multiple sources by ranking the sources that results are received from and not presenting duplicate results from lower ranked sources. For example, results from a first source and a second source may be received. The results from the first source may be presented in a row closer to the top of a screen than the results from the second source in response to the user having a preference for the first source over the second source (e.g., the user likes AMAZON® more than HBO®). The system then determines whether a result that will be displayed for AMAZON® matches a result that will be displayed for HBO® (e.g., by comparing metadata of the two results). If the two results match, the result is only presented for the higher ranked source (e.g., AMAZON®) and another result is presented in the second row that does not match any of the displayed results in the first row. In this way, the user is provided with search results that are distinct as opposed to presenting the same result multiple times when it is available from different sources.

In some aspects, a media guidance application receives a user input. For example, the media guidance application may receive a user input via a user input interface (e.g., a remote control or touchscreen interface). The user input may be a string of one or multiple alphanumeric or other characters. Alternatively or additionally, the user input may be selecting one of a plurality of selectable options with common search queries. For example, the media guidance application may present the most commonly searched keywords as selectable options for the user to select, saving the user time that he or she may have to input the characters.

The media guidance application searches for results from a first source and a second source based on the user input. For example, the media guidance application may transmit the user input to the first source and the second source. For example, the media guidance application may generate a data packet including the user input (e.g., a string of characters) and/or other parameters for the search (e.g., results should be during a certain time period). In some embodiments, the media guidance application may utilize an API from one or both of the sources to transmit a search query (e.g., based on the user input). The media guidance application may determine the sources to transmit the user input based on user preferences (e.g., a stored user preference in a user profile) for specific sources. For example, the user may store a preference that search queries should be sent to a particular set of sources (e.g., to AMAZON® and HULU®). Alternatively or additionally, the media guidance application may generate a graphical user interface at the time of the user input allowing the user to select sources. For example, the media guidance application may generate a field where the user can enter a string of characters (e.g., the user input) and a series of selectable options for sources to search for results.

The media guidance application receives first search results from the first source and second search results from the second source. For example, the media guidance application may receive a plurality of results that match the user input from both sources. The results from each source may be received in separate tables, where each table contains a plurality of rows, each with an identifier of a matching result (e.g., the title of a media asset) and additional information in associated fields (e.g., an actor in a media asset). In some embodiments, the results may be ranked according to popularity. Alternatively or additionally, the results may be ranked according to relevance to the user input. For example, despite "The Big Bang Theory" being the most popular result (e.g., many users click on it), because the user input is "Bang," the result "Bangerz," an album by Miley Cyrus, may be ranked higher because the first word is matched to the query. Alternatively or additionally, the media guidance application may reorder the results based on any combination of the factors discussed above, as well as based on user preferences. For example, if the media guidance application retrieves a user preference that the user likes movies with a given actor, results with that actor may be elevated in the ranking.

The media guidance application retrieves a user preference indicating a preference for the first source over the second source. For example, the media guidance application may retrieve a user profile stored locally or remotely at a server. The media guidance application may retrieve search preferences from the user profile. For example, the media guidance application may store a ranking of sources set by the user. As a specific example, the media guidance application may generate a graphical user interface where the user can drag and drop sources (e.g., HULU®, AMAZON®, etc.) into a particular order to reflect his or her preferences. The media guidance application may then store (e.g., in an array) the rank and an identifier of each source. The media guidance application may retrieve the stored ranks of sources set by the user and determine respective ranks of the first and second sources. For example, the media guidance application may determine that HULU®, identified by the string of characters "hulu", is associated with a ranking of "5". If the ranking for AMAZON® is "3", the media guidance application may determine that the user prefers AMAZON® to HULU® and generates results from the two sources based on the preference, as described further below.

The media guidance application generates for display a grid comprising a plurality of rows with search results. For example, the media guidance application may generate results from the first source above results from the second source and only display results from the second source that don't match results displayed from the first source. Specifically, the media guidance application determines, based on the retrieved user preference indicating the preference for the first source over the second source, to generate for display the first search results from the first source in a first row. For example, the media guidance application may determine a particular location (e.g., a row) to generate results from the first source in. In some embodiments, the row may be located at a row closer to the top of the screen than a second row where results from the second source are presented.

The media guidance application determines a first subset of the first search results that fit in the first row and a second subset of the second search results that fit in a second row, wherein the first subset includes a first result of the first search results, and wherein the second subset includes a second result but not a third result of the second search results. For example, the media guidance application may determine a number of results that fit in the first row and the second row. The number may be constant (e.g., each row always contains 3 results) or may vary based on the length of identifiers of the results (e.g., results with a large number of characters take up more space and fewer can be displayed at once). In some embodiments, the number may be different for the first row and the second row. For example, by virtue of being preferred based on the user preference, more results may be displayed for the first row (e.g., the first row may take up more display space and display results in two sub-rows) than the second row. The media guidance application may then select the appropriate number of results from the received search results from the two sources to display (e.g., the first and second subsets). The first subset may include a first result that matches a second result in the second subset. For example, "The Big Bang Theory" may be present in the first and second subsets. In order to present non-duplicate results to the user, the media guidance application may select a third result of the second search results that does not match one of the results in the first subset instead of the second result, as described further below.

The media guidance application compares metadata associated with the first result with metadata associated with the second result. For example, the media guidance application may retrieve metadata associated with a result locally from storage or a remote server. The media guidance application may, alternatively or additionally, receive the metadata in fields of a table associated with the results received from a source. The metadata may be any data related to the result that describes content associated with the result. For example, if the result is for a news article, the metadata may include the author of the article, type of the article (e.g., opinion), and/or publication name (e.g., Nature). The media guidance application may execute a program script to iteratively compare characters of metadata (e.g., attributes) of two results to determine whether the two results match. For example, the media guidance application may compare the string of characters "Matt Damon," associated with the first result, with the string of characters "Matt Dillon," associated with the second result.

In some embodiments, the media guidance application may retrieve metadata from a database and compare the characters of the retrieved metadata to determine whether two results match. Specifically, the media guidance application compares a first identifier of the first result and a second identifier of the second result with a plurality of identifiers stored in a database. The identifier may be any combination of characters that define the results, such as a title associated with the result, a URL, and/or a numerical value (e.g., a serial code). For example, the media guidance application may access the database stored locally in storage or at a remote server via a communications network. The database may be organized as a series of multiple linked tables (e.g., a relational database), where a plurality of identifiers in a first table are each associated with a pointer to another table containing metadata associated with the identifier. For example, the media guidance application may compare characters of the first and second identifier with the stored plurality of identifiers. The media guidance application determines that a first stored identifier matches the first identifier and a second stored identifier matches the second identifier. For example, the media guidance application may determine that a first stored identifier matches the first identifier and a second stored identifier matches the second identifier. The media guidance application may then access the appropriate linked tables based on pointers in fields corresponding to the first stored identifier and the second stored identifier.

The media guidance application retrieves first metadata from a first field associated with the first stored identifier and second metadata from a second field associated with the second stored identifier. For example, the tables containing metadata associated with each stored identifier may be structured so that metadata in a first field of each table is always a title associated with the result, metadata in a second field of each table is always a director, etc., for easier comparison (e.g., metadata for the same attribute can be compared without having to compare each stored value to every stored value associated with another identifier). Alternatively or additionally, the table may be structured such that each field with metadata is associated with a label, such as "ACTOR" which can be used to compare corresponding metadata associated with different identifiers. The media guidance application may retrieve metadata from a first field associated with the first identifier (e.g., a title) and metadata from a second field associated with the second identifier (e.g., also a title). The media guidance application then compares first characters of the first metadata associated with the first result with second characters of the second metadata associated with the second result. For example, the media guidance application may compare each character of a retrieved string of characters associated with the first result (identified by the first identifier) with characters of a retrieved string of characters associated with the second result (identified by the second identifier).

The media guidance application determines, based on the comparing, that the first result matches the second result. For example, the media guidance application may determine that if each character of a specific attribute associated with the first result matches each character of the corresponding attribute associated with the second result that the two results match. For example, if two results contain metadata referring to actor "Matt Damon," the media guidance application may determine the metadata matches and thus the two results match. Alternatively or additionally, the media guidance application may determine whether all the metadata (e.g., all the attributes) associated with the first result, or a threshold percentage (e.g., 50%), match corresponding metadata of the second result. For example, if the media guidance application determines the title, director, and genre attributes match between two results, the media guidance application may determine that the two results match with greater confidence than if only one attribute matched.

In some embodiments, certain attributes (e.g., title) may be weighted more in determining whether two results match because the attributes are more distinct between results. For example, many results may refer to "Matt Damon," so false positive matches may occur if only actor metadata is matched, but it is less likely that multiple results refer to "The Bourne Identity," and, as such, that title is weighted higher than actor. In some embodiments, if a threshold number of characters match between an attribute of the first result and an attribute of the second result, then the media guidance application may determine a match. For example, in some instances due to spelling errors or other typographical mistakes, a single character may be different between metadata associated with the first result and metadata associated with the second result (e.g., "Tom Hanks" and "Tom Hankz"). In this situation, if a threshold (e.g., all except one character) amount of characters match, the media guidance application may determine the metadata associated with the first and second results match.

In some embodiments, the media guidance application may determine the number of results to select for the first and second subsets based on a display template. Specifically, the media guidance application retrieves a display template for the grid. For example, the media guidance application may retrieve, either locally from storage or remotely from a server via a communications network, the display template. The display template may be any suitable data structure, such as a class or a table, which contains parameters for displaying results from multiple sources in different rows. The media guidance application retrieves, from a first field of the display template associated with the first row, a first value for a first number of results that fit in the first row. For example, the media guidance application may retrieve an integer (e.g., "3") for the number of results in the first row from a field in the display template. Alternatively or additionally, the media guidance application may retrieve a value or values corresponding to the size of the display area of the first row and calculate a number of results that can fit in the first row. The media guidance application retrieves, from a second field of the display template associated with the second row, a second value for a second number of results that fit in the second row. Similarly to the value for the number of results that fit in the first row, the media guidance application may retrieve an integer (e.g., "3") for the number of results in the first row from a field in the display template. In some embodiments, the number of results that fit in the first row may be different than the number that fit in the second row. For example, the media guidance application may present a greater number of results from the first source since it is preferred by the user.

The media guidance application then selects the first number of results from the first search results as the first subset. For example, the media guidance application may retrieve the number of results that were determined to fit in the first row from the first search results (e.g., retrieve identifiers of results from a table containing the results received from the first source, as discussed above). The media guidance application may generate the first subset by adding identifiers of the number of results from the first search results to a list or other data structure. The media guidance application selects the second number of results from the second search results as the second subset. For example, the media guidance application may retrieve the number of results that were determined to fit in the second row from the second search results (e.g., retrieve identifiers of results from a table containing the results received from the second source, as discussed above). The media guidance application may generate the second subset by adding identifiers of the number of results from the second search results to a list or other data structure. The media guidance application may retrieve additional text and/or graphics associated with each identifier of the first and second subsets to populate an instance of the display template (e.g., such that each result is displayed according to parameters in the display template).

In some embodiments, the media guidance application determines which results to select based on a relevance ranking of results from each source. Specifically, the media guidance application ranks each result in the first search results and each result in the second search results based on a relevance of each result to the user input. For example, the media guidance application may receive search results from a source that are already ranked in terms of popularity (e.g., based on the number of times users have clicked particular links) and/or character matching (e.g., how many characters of a search query submitted by the user matched characters of a result). In this situation, the media guidance application may further rank the results based on user preferences (e.g., elevate certain results based on user preferences for those results) or may simply retrieve the highest ranked results without further ranking. If the results received from a source are unranked and are only ranked based on similarity to the user's query, the media guidance application may, for each result, determine a relative popularity. For example, the media guidance application may compare an identifier of each result with popularities stored in a data structure (either local in storage or at a remote server). The media guidance application may then rank the results received from a source based on the retrieved popularity values. For example, the popularity values may be Nielsen ratings of television shows.

The media guidance application retrieves a highest ranked result in the first search results as the first result in the first subset. For example, the media guidance application may retrieve the highest ranked result of the ranked first search results as the first result. The media guidance application may continue retrieving the number of results that fit in the first row (e.g., as discussed above) by retrieving a next highest ranked result from the first search results. The media guidance application retrieves a highest ranked result in the second search results as the second result in the second subset. For example, the media guidance application may retrieve the highest ranked result of the second search results as the second result. The media guidance application may continue retrieving the number of results that fit in the second row (e.g., as discussed above) by retrieving a next highest ranked result from the second search results.

The media guidance application, in response to determining that the first result matches the second result, modifies the second subset by replacing the second result in the second subset with the third result. For example, upon determining that two results that are to be displayed at the same time (e.g., they are in the first and second subsets), the media guidance application replaces the result of the source that the user does not prefer with another result. For example, if "The Big Bang Theory" is a result from both the first and second sources and in the first and second subsets, the result in the second subset may be replaced with another result. As discussed further below, the result that replaces the second result may be based on user preferences or based on a ranking of each result in the search results from the second source.

In some embodiments, the media guidance application modifies the second subset by replacing the second result with a next highest ranked result. Specifically, the media guidance application retrieves a next highest ranked result not in the second subset as the third result. For example, the media guidance application may retrieve a result from a list of ranked results (e.g., either received from the source of the search results or generated by the media guidance application as discussed above) that is the highest ranked result not part of the second subset. The media guidance application may further determine whether the retrieved next highest ranked result matches a result in the first subset (e.g., by comparing metadata as discussed above). For example, if the media guidance application determines that the next highest ranked result matches a result in the first subset, the media guidance application may retrieve another result (e.g., one result lower on a ranked list) until a result does not match one of the first subset.

The media guidance application may remove the second result from the second subset. For example, the media guidance application may remove an identifier associated with the second result from a list or other data structure storing identifiers of the second subset. The media guidance application may then add the third result to the second subset. For example, the media guidance application may add an identifier of the next highest ranked result (that doesn't match any of the results in the first subset) to the list or other data structure. The media guidance application may add the identifier to the same field previously populated by the identifier of the second result that was removed, or may reorder the identifiers (e.g., based on popularity). In some embodiments, the media guidance application uses the order of the identifiers stored in the list or other data structure as the order the identifiers are presented to the user in the rows.

In some embodiments, the media guidance application modifies the second subset by replacing the second result with a result that matches a user preference. Specifically, the media guidance application retrieves a second user preference for an attribute of search results. For example, the media guidance application may retrieve a user profile containing a plurality of user preferences. The media guidance application may retrieve preferences from the user profile. For example, the media guidance application may retrieve that the user enjoys movies that include actor "Matt Damon." The media guidance application may compare a retrieved user preference with metadata associated with each result of the search results from a source. For example, the media guidance application may retrieve metadata associated with a result from local storage or a remote server.

The media guidance application may then determine for each result whether the user preference matches metadata associated with each result (e.g., based on character comparison). In some embodiments, the media guidance application compares every user preference in the user profile to metadata associated with the results and ranks the results based on how many user preferences match metadata associated with each result. For example, if both an actor and a genre of a result match user preferences, the result may be ranked higher than another result where only the actor associated with the result matches a user preference. In some embodiments, the media guidance application may weight certain user preferences higher (e.g., based on an indication stored in the user profile) when determining which result to replace the second result with. For example, the media guidance application may determine that a retrieved user preference for "action movies" is a "low preference" to the user based on the user designating it as such. In contrast, the media guidance application may determine that a retrieved user preference for "Matt Damon" is a "high preference" to the user.

The media guidance application, in response to determining that the attribute of the third result matches the second user preference, removes the second result from the second subset. For example, the media guidance application may remove an identifier associated with the second result from a list or other data structure storing identifiers of the second subset. The media guidance application may then add the third result to the second subset. For example, the media guidance application may add an identifier of the result that matches (or most closely matches) the user preference(s) to the list or other data structure. The media guidance application may add the identifier to the same field previously populated by the identifier of the second result that was removed, or may reorder the identifiers (e.g., based on popularity). In some embodiments, the media guidance application uses the order of the identifiers stored in the list or other data structure as the order the identifiers are presented to the user in the rows.

The media guidance application generates for display the first subset in the first row and the modified second subset in the second row. For example, the media guidance application may generate identifiers of each result in the first subset in the first row. As a specific example, the identifiers may be text or graphics that identify each result. The media guidance application may receive the identifiers from the sources, or may retrieve them from local storage or a remote server. The media guidance application may similarly generate identifiers of each result in the modified second subset (e.g., where the third result has replaced the second result) in the second row. In some embodiments, the media guidance application generates an indication (e.g., an arrow pointing sideways) that more results are available. In response to receiving a user selection of the arrow, the media guidance application may generate a new subset for either only the source for which the arrow was selected (e.g., more results from AMAZON® are displayed replacing the current results) or for all displayed sources (e.g., more results from AMAZON® and HULU® are displayed replacing the current results). Whenever the results in the subsets that are displayed change (e.g., based on a user input to view more results), the media guidance application determines whether any results in rows that are lower match results in rows that are higher and replaces those results, as described above.

In some embodiments, the media guidance application determines the total number of duplicate results received from the first and second sources and displays the number to the user. Specifically, the media guidance application compares each result of the first search results with each result of the second search results. For example, the media guidance application may compare metadata associated with each result of the first search results with metadata of each search result received from the second source. For example, the media guidance application may execute a program script utilizing a for-loop to iteratively compare each result from the first source with each result from the second source. The media guidance application then determines, based on comparing each result of the first search results with each result of the second search results, a number of duplicate results between the first search results and the second search results. For example, the media guidance application may initialize a counter and increment the counter each time a match is determined between a result from the first source and a result from the second source until every result from the first source has been compared to the search results from the second source. As discussed above, the media guidance application may determine a match if a threshold percentage of metadata associated with two search results match. The media guidance application then generates for display an indication of the number of duplicate results in the second row. For example, the media guidance application may generate for display text with the value for the total number of duplicates (e.g., "30") in the first row or the second row. The indication may optionally contain text clarifying which source the duplicates refer to. For example, if AMAZON® is the source for the first row and HULU® is the source for the second row, the media guidance application may generate text, "30 duplicate sources with Amazon" in the second row.

In some embodiments, the media guidance application may display other sources that returned the same result upon receiving a user selection of the result. Specifically, the media guidance application receives a user selection of the first result. For example, the media guidance application may, via user input interface such as a remote control or touchscreen interface, receive a selection of a particular result displayed on the grid. As a specific example, the media guidance application may determine that the result for "The Big Bang Theory" in the first row (e.g., the most preferred source of the user) has been selected by the user. The media guidance application may determine other sources where a result for "The Big Bang Theory" was received by comparing metadata associated with the selected result to results from other sources, as discussed above. For example, the media guidance application may determine that the second result (from the second source) matches the first result (e.g., from the first source) and that the first source is selected by the user. The media guidance application, in response to receiving the user selection, generates for display an indication that the first result is also available from the second source. For example, if both the first and the second search results include a result for "The Big Bang Theory," upon a user selecting "The Big Bang Theory" result in the first row containing the first search results, the media guidance application may generate for display an indication that the result was also returned by the second source. As a specific example, the media guidance application may generate for display text, "This result was also returned by Hulu." In this way, the media guidance application may provide the user with alternate sources where a result is available without having to show the same result in each row.

In some embodiments, the media guidance application receives a request from the user expressing a preference for the second source instead of the first source and the media guidance application replaces duplicate results between the first and second subset from the first subset instead of the second subset. Specifically, the media guidance application may receive a second user input indicating a second preference for the second source over the first source. For example, the media guidance application, when generating the grid with the search results from the first and second results for display, may include selectable options (e.g., arrows) to swap a row with results from one source with another row with results from another source. The media guidance application may receive a user selection of one of the selectable options to elevate the second row with results from the second source above the first row with results from the first source. For example, the user may select (e.g., via a user input interface such as a remote control) an arrow graphic pointing upwards and the media guidance application may determine that the user selection is a request to swap the first and second rows (e.g., if the first row is directly above the second row). The media guidance application may store (e.g., in a user profile) the new user preference for the second source over the first source for use when generating future grids with search results from the two sources.

The media guidance application, in response to receiving the second user input, swaps the rows where the first and second search results are displayed and determines whether duplicates from the less preferred source (e.g., the first source) exist with the more preferred source (e.g., the second source). Specifically, the media guidance application generates a third subset of the second search results by replacing the third result in the modified second subset with the second result. For example, now that the second source is preferred over the first source, results from the second source are preferred. Thus, the second result (e.g., for "The Big Bang Theory") may be added back into the second subset to create a new third subset of results to display. The media guidance application may generate a new list or other data structure with identifiers of each result that is part of the third subset, or modify an existing list or other data structure for the second subset. In some embodiments, the second result replaces the third result. In other embodiments, another result previously in the subset is removed and both the second and third results are in the third subset.

The media guidance application generates a fourth subset of the first search results by replacing the first result in the first subset with a fourth result of the first search results, wherein the fourth result is not in the first subset. For example, now that the second source is preferred over the first source, results from the first source that match results of the second source need to be replaced with other results. Thus, the first result (e.g., for "The Big Bang Theory") may be replaced with a fourth result of the first results that does not match any of the results in the third subset (e.g., based on comparing metadata as discussed above). The media guidance application may generate a new list or other data structure with identifiers of each result that is part of the fourth subset, or modify an existing list or other data structure for the first subset. The media guidance application then generates for display the third subset in the first row instead of the first subset and the fourth subset in the second row instead of the modified second subset. For example, the media guidance application may generate indicators (e.g., text and/or graphics) associated with each result of the third subset in the first row and each result of the fourth subset in second row. In this way, duplicate results are still not presented, but since the second source is now preferred over the first source, duplicate results are replaced from the first results, not the second results.

In some embodiments, the results identify media assets and the media guidance application presents selectable options to perform actions related to the media assets. Specifically, the media guidance application receives a user selection of the first result. For example, the media guidance application may, via user input interface such as a remote control or touchscreen interface, receive a selection of a particular result displayed on the grid. As a specific example, the media guidance application may determine that the result for "The Big Bang Theory" in the first row (e.g., the most preferred source of the user) has been selected by the user. The media guidance application, in response to receiving the user selection, generates for display a plurality of selectable options associated with the media asset. The plurality of options may include an option to add the media asset to a watch list. For example, upon selection of the option to add the media asset to the watch list by the user, the media guidance application may store an identifier associated with the media asset in a data structure that includes identifiers of media assets the user desires to watch at some future time.

The plurality of options may include an option to add the media asset to a favorites list. For example, upon selection of the option to add the media asset to the favorites list by the user, the media guidance application may store an identifier associated with the media asset in a data structure that includes identifiers of media assets the user likes. In some embodiments, the favorites list may be used for determining user preferences for particular results when determining which result to replace a duplicate result with, as discussed above. The plurality of options may include an option to view upcoming times the media asset is available. For example, upon selection of the option to view upcoming times the media asset is available by the user, the media guidance application may query a media guidance database (e.g., stored locally in storage or at a remote server) for times and sources that the media asset is available from. The media guidance application may then generate for display the times and sources that the media asset is available from.

The plurality of options may include an option to record the media asset. For example, upon selection of the option to record the media asset by the user, the media guidance application may determine whether the media asset is available from a source during a certain period of time. If the media asset is available, the media guidance application may schedule a recording (e.g., by adding an identifier of the media asset and the source and time that the media asset is available to a scheduling data structure). If the media asset is not available, the media guidance application may add the media asset to the watch list, as discussed above.

The described systems and methods can present search results from different sources in different rows based on user preferences and ensure that less preferred sources do not display duplicates with more preferred sources. Conventional systems may present results from different sources organized by the source of the results. However, this process neglects user preferences when ordering the results based on their respective sources. Furthermore, conventional systems do not determine that a lower ranked source (based on the user's preferences) contains a duplicate result with a higher ranked source and accordingly present a different result. The described systems and methods, by accounting for and removing duplicates, can maximize the number of unique results that can be presented on a given display screen.

It should be noted the systems and/or methods described above may be applied to, or used in accordance with, other systems, methods and/or apparatuses described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described for presenting search results from multiple sources by ranking sources that results are received from and not presenting duplicate results from lower ranked sources. For example, results from a first source and a second source may be received. The results from the first source may be presented in a row closer to the top of a screen than the results from the second source in response to the user having a preference for the first source over the second source (e.g., the user likes AMAZON® more than HBO®). The system then determines whether a result that will be displayed for AMAZON® matches a result that will be displayed for HBO® (e.g., by comparing metadata of the two results). If the two results match, the result is only presented for the higher ranked source (e.g., AMAZON®) and another result is presented in the second row that does not match any of the displayed results in the first row. In this way, the user is provided with search results that are all different as opposed to presenting the same result multiple times when it is available from different sources.

Figure 1:
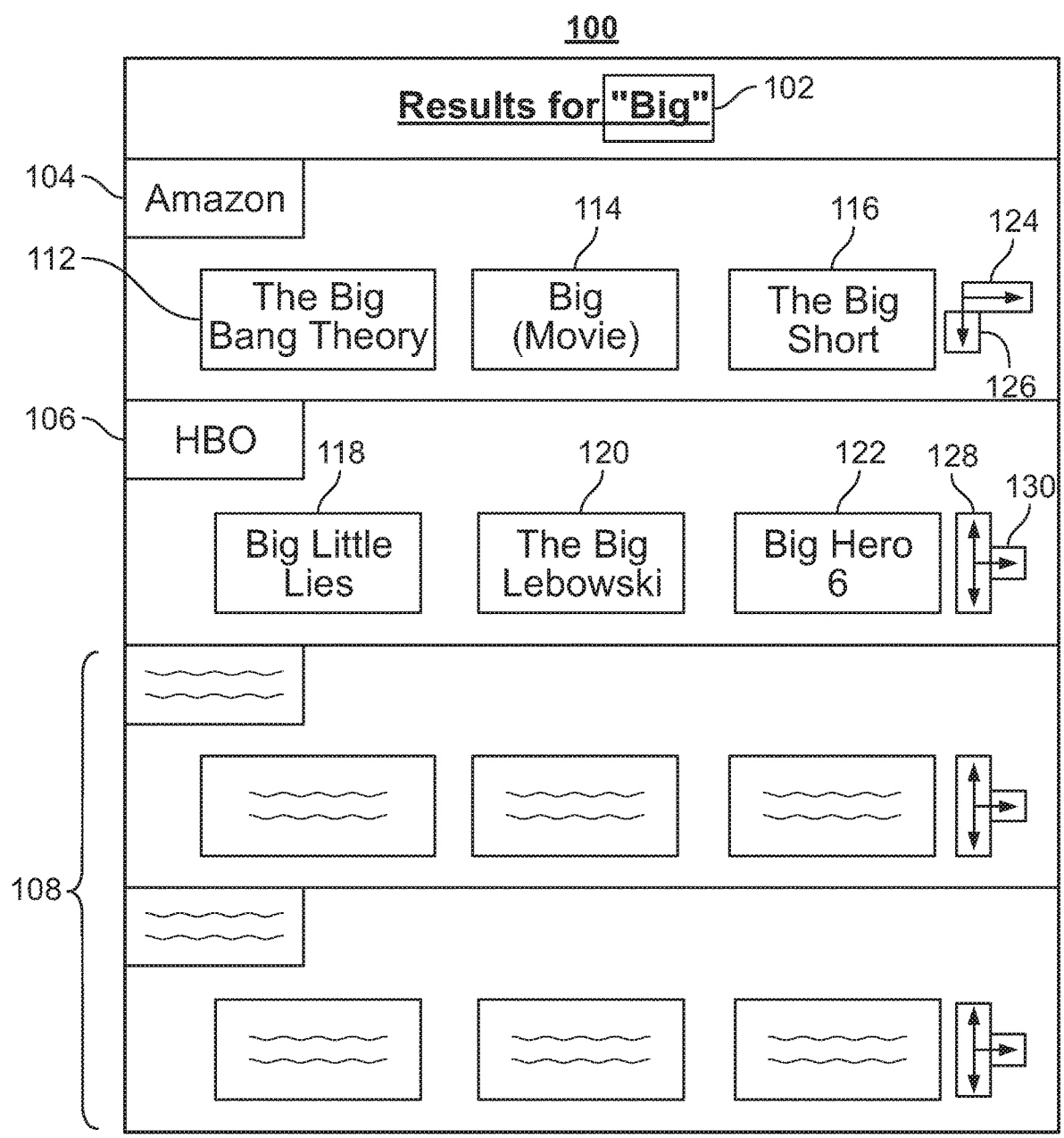
FIG. 1 shows an illustrative example of a display showing search results from a plurality of sources in a grid, in accordance with some embodiments of the disclosure.

FIG. 1 shows an illustrative example of a display showing search results from a plurality of sources in a grid, in accordance with some embodiments of the disclosure. For example, display 100 may be coupled to user equipment which executes a media guidance application in order to display search results relating to user query 102. User query 102 may be received via a user input interface coupled to the same user equipment displaying display 100 or other user equipment. Display 100 includes a grid comprising rows for sources 104 and 106, as well as additional sources 108. Each row for a source (e.g., source 104 or source 106) contains a subset of the results from the source. For example, results 112, 114, and 116 are displayed from source 104 and results 118, 120, and 122 are displayed from source 106. Source 104 and source 106 may include the same result (e.g., result 112 is part of the subsets to be displayed from both sources), as discussed below. In response, the media guidance application may remove the duplicate result from the source that the user prefers less (e.g., from source 106).

Display 100 may include sources ordered (e.g., from top to bottom) based on user preferences. For example, if a user preference stored in a user profile indicates source 104 is preferred to source 106, the media guidance application may generate source 104 above source 106 in display 100. Display 100 may include arrows 124 and 130 to display additional results associated from sources 104 and 106, respectively. Display 100 may include arrows 126 and 128 to reorder the sources. For example, upon a selection of one of arrows 126 or 128, the media guidance application may reorder the sources presented on display 100 (e.g., source 106 may be the first row and source 104 may be the second row). Display 100 may appear on one or more user devices (e.g., any of the devices listed in FIGS. 6-7 below). Moreover, the media guidance application may use one or more of the processes described in FIGS. 8-12 to generate display 100 or any of the features described therein.

In some embodiments, a media guidance application receives a user input. For example, the media guidance application may receive a user input via a user input interface (e.g., a remote control or touchscreen interface). The user input may be a string of one or multiple alphanumeric or other characters (e.g., "Big"). Alternatively or additionally, the user input may be selecting one of a plurality of selectable options with common search queries. For example, the media guidance application may present the most commonly searched keywords as selectable options for the user to select, saving the user time that he or she may have to input the characters.

The media guidance application searches for results from a first source and a second source based on the user input. For example, the media guidance application may transmit the user input (e.g., user query 102) to the first source and the second source (e.g., sources 104 and 106). For example, the media guidance application may generate a data packet including the user input (e.g., a string of characters) and/or other parameters for the search (e.g., results should be during a certain time period). In some embodiments, the media guidance application may utilize an API from one or both of the sources (e.g., one or both of sources 104 and 106) to transmit a search query (e.g., based on the user input). The media guidance application may determine the sources (e.g., sources 104 and 106) to transmit the user input to based on user preferences (e.g., a stored user preference in a user profile) for specific sources. For example, the user may store a preference that search queries should be sent to a particular set of sources (e.g., sources 104 and 106). Alternatively or additionally, the media guidance application may generate a graphical user interface at the time of the user input allowing the user to select sources (e.g., sources 104 and 106). For example, the media guidance application may generate a field where the user can enter a string of characters (e.g., user query 102) and a series of selectable options for sources to search for results.

As referred to herein, a "result" should be understood as data that is related to or matches an input from a user. For example, the data may be a link to a location of data, such as a URL to a webpage or a link to a location in storage where a media asset is stored. As another example the data may be text or a graphic that matches the user input (e.g., if the user input is "orange" an image for the fruit may be a result). As referred to herein, "search results" should be understood as one or more results received from a source. For example, a source that is queried for results based on the user input may return multiple results (e.g., links to different URLs, pointers to different locations in storage, graphics, etc.).

The media guidance application receives first search results from the first source and second search results from the second source. For example, the media guidance application may receive a plurality of results that match the user input (e.g., user query 102) from both sources (e.g., sources 104 and 106). The results from each source (e.g., sources 104 and 106) may be received in separate tables, where each table contains a plurality of rows, each with an identifier of a matching result (e.g., the title of a media asset) and additional information in associated fields (e.g., an actor in a media asset). In some embodiments, the results may be ranked according to popularity, as described further below with respect to FIGS. 2 and 10. Alternatively or additionally, the results may be ranked according to relevance to the user input, as described further below with respect to FIGS. 2 and 10. For example, despite "The Big Bang Theory" being the most popular result (e.g., many users click on it), because the user input is "Bang," the result "Bangerz," an album by Miley Cyrus, may be ranked higher because the first word is matched to the query. Alternatively or additionally, the media guidance application may reorder the results based on any combination of the factors discussed above, as well as based on user preferences. For example, if the media guidance application retrieves a user preference that the user likes movies with a given actor, results with that actor may be elevated in the ranking.

The media guidance application retrieves a user preference indicating a preference for the first source over the second source. For example, the media guidance application may retrieve a user profile stored locally or remotely at a server. The media guidance application may retrieve search preferences from the user profile. For example, the media guidance application may store a ranking of sources (e.g., sources 104 and 106) set by the user. As a specific example, the media guidance application may generate a graphical user interface where the user can drag and drop sources (e.g., sources 104 and 106) into a particular order to reflect his or her preferences. The media guidance application may then store (e.g., in an array) the rank and an identifier of each source (e.g., sources 104 and 106). The media guidance application may retrieve the stored ranks of sources (e.g., sources 104 and 106) set by the user and determine respective ranks of the first and second sources. For example, the media guidance application may determine that HULU®, identified by the string of characters "hulu", is associated with a ranking of "5". If the ranking for AMAZON® is "3", the media guidance application may determine that the user prefers AMAZON® to HULU® and generates results from the two sources based on the preference in a grid (e.g., display 100), as described further below.

The media guidance application generates for display a grid comprising a plurality of rows with search results. For example, the media guidance application may generate results from the first source (e.g., source 104) above results from the second source (e.g., source 106) and only display results from the second source that don't match results displayed from the first source. Specifically, the media guidance application determines, based on the retrieved user preference indicating the preference for the first source over the second source, to generate for display the first search results from the first source in a first row. For example, the media guidance application may determine a particular location (e.g., a row) to generate results (e.g., results 112, 114, and 116) from the first source (e.g., source 104) in. In some embodiments, the row may be located at a row closer to the top of the screen (e.g., display 100) than a second row where results from the second source are presented.

The media guidance application determines a first subset of the first search results that fit in the first row and a second subset of the second search results that fit in a second row, wherein the first subset includes a first result of the first search results, and wherein the second subset includes a second result but not a third result of the second search results. For example, the media guidance application may determine a number of results that fit in the first row and the second row. The number may be constant (e.g., each row always contains 3 results) or may vary based on the length of identifiers of the results (e.g., results with a large number of characters take up more space and fewer can be displayed at once). In some embodiments, the number may be different for the first row and the second row. For example, by virtue of being preferred (e.g., source 104 is preferred over source 106) based on the user preference, more results may be displayed for the first row (e.g., the first row may take up more display space and display results in two sub-rows) than the second row. The media guidance application may then select the appropriate number of results from the received search results from the two sources to display (e.g., results 112, 114, and 116 are selected from the results received from source 104). The first subset may include a first result that matches a second result in the second subset. For example, "The Big Bang Theory" (e.g., result 112) may be present in the first and second subsets (e.g., the selected results from source 104 and 106 both include the same result). In order to present non-duplicate results to the user, the media guidance application may select a third result of the second search results that does not match one of the results in the first subset (e.g., does not match result 112, 114, or 116) instead of the second result, as described further below.

The media guidance application compares metadata associated with the first result with metadata associated with the second result. For example, the media guidance application may retrieve metadata associated with a result (e.g., result 112) locally from storage or a remote server. The media guidance application may, alternatively or additionally, receive the metadata in fields of a table associated with the results received from a source (e.g., source 104). The metadata may be any data related to the result that describes content associated with the result. For example, if the result is for a news article, the metadata may include the author of the article, type of the article (e.g., opinion), and/or publication name (e.g., Nature). The media guidance application may execute a program script to iteratively compare characters of metadata (e.g., attributes) of two results to determine whether the two results match (e.g., result 112 from source 104 and result 118 from source 106 are compared). For example, the media guidance application may compare the string of characters "Matt Damon" associated with the first result, with the string of characters "Matt Dillon," associated with the second result.

The media guidance application determines, based on the comparing, that the first result matches the second result. For example, the media guidance application may determine that if each character of a specific attribute associated with the first result (e.g., result 112 from source 104) matches each character of the corresponding attribute associated with the second result (e.g., a result that matches result 112 from source 106) that the two results match. For example, if two results contain metadata referring to actor "Matt Damon," the media guidance application may determine the metadata matches and thus the two results match. Alternatively or additionally, the media guidance application may determine whether all the metadata (e.g., all the attributes) associated with the first result (e.g., from source 104), or a threshold percentage (e.g., 50%), match corresponding metadata of the second result (e.g., from source 106). For example, if the media guidance application determines the title, director, and genre attributes match between two results, the media guidance application may determine that the two results match with greater confidence than if only one attribute matched.

In some embodiments, certain attributes (e.g., title) may be weighted more in determining whether two results match because the attributes are more distinct between results. For example, many results may refer to "Matt Damon," so false positive matches may occur if only actor metadata is matched, but it is less likely that multiple results refer to "The Bourne Identity," and as such title is weighted higher than actor. In some embodiments, if a threshold number of characters match between an attribute of the first result (e.g., from source 104) and an attribute of the second result (e.g., from source 106), then the media guidance application may determine a match. For example, in some instances due to spelling errors or other typographical mistakes, a single character may be different between metadata associated with the first result and metadata associated with the second result (e.g., "Tom Hanks" and "Tom Hankz"). In this situation, if a threshold (e.g., all except one character) amount of characters match, the media guidance application may determine the metadata associated with the first and second results match.

In some embodiments, the media guidance application may determine the number of results to select for the first and second subsets based on a display template. Specifically, the media guidance application retrieves a display template (e.g., to generate display 100) for the grid. For example, the media guidance application may retrieve, either locally from storage or remotely from a server via a communications network, the display template. The display template may be any suitable data structure, such as a class or a table, which contains parameters for displaying results from multiple sources in different rows. The media guidance application retrieves, from a first field of the display template associated with the first row, a first value for a first number of results that fit in the first row. For example, the media guidance application may retrieve an integer (e.g., "3") for the number of results in the first row from a field in the display template. Alternatively or additionally, the media guidance application may retrieve a value or values corresponding to the size of the display area of the first row and calculate a number of results that can fit in the first row. The media guidance application retrieves, from a second field of the display template associated with the second row, a second value for a second number of results that fit in the second row. Similarly to the value for the number of results that fit in the first row, the media guidance application may retrieve an integer (e.g., "3") for the number of results in the first row from a field in the display template. In some embodiments, the number of results that fit in the first row may be different than the number that fit in the second row. For example, the media guidance application may present a greater number of results from the first source (e.g., source 104) since it is preferred by the user.

The media guidance application then selects the first number of results from the first search results as the first subset. For example, the media guidance application may retrieve the number of results that were determined to fit in the first row from the first search results (e.g., if 3 results fit in the first row, results 112, 114, and 116 from source 104 may be retrieved). The media guidance application may generate the first subset by adding identifiers of the number of results from the first search results to a list or other data structure. The media guidance application selects the second number of results from the second search results as the second subset. For example, the media guidance application may retrieve the number of results that were determined to fit in the second row from the second search results (e.g., if 3 results fit in the first row, a result matching result 112, result 120, and result 122 from source 106 may be retrieved). The media guidance application may generate the second subset by adding identifiers of the number of results from the second search results to a list or other data structure. The media guidance application may retrieve additional text and/or graphics associated with each identifier of the first and second subsets to populate an instance of the display template (e.g., such that each result is displayed according to parameters in the display template).

The media guidance application, in response to determining that the first result matches the second result, modifies the second subset by replacing the second result in the second subset with the third result. For example, upon determining that two results that are to be displayed at the same time (e.g., they are in the first and second subsets), the media guidance application replaces the result of the source (e.g., a result that matches result 112, but from source 106) that the user does not prefer with another result (e.g., with result 118). For example, if "The Big Bang Theory" is a result from both the first and second sources and in the first and second subsets, the result in the second subset may be replaced with another result. As discussed further below with respect to FIG. 2, the result that replaces the second result may be based on user preferences or based on a ranking of each result in the search results from the second source.

The media guidance application generates for display the first subset in the first row and the modified second subset in the second row. For example, the media guidance application may generate identifiers of each result in the first subset (e.g., results 112, 114, and 116) in the first row. As a specific example, the identifiers may be text or graphics that identify each result. The media guidance application may receive the identifiers from the sources (e.g., source 104 or source 106), or may retrieve them from local storage or a remote server. The media guidance application may similarly generate identifiers of each result in the modified second subset (e.g., results 118, 120, and 122) in the second row. In some embodiments, the media guidance application generates an indication (e.g., arrows 124 and 130) that more results are available. In response to receiving a user selection of the indication, the media guidance application may generate a new subset for either only the source for which the arrow was selected (e.g., if arrow 124 is selected, more results from only source 104 are displayed) or for all displayed sources (e.g., if arrow 124 is selected, more results from both source 104 and source 106 are displayed). Whenever the results in the subsets that are displayed change (e.g., based on a user input to view more results), the media guidance application determines whether any results in rows that are lower match results in rows that are higher and replaces those results, as described above.

In some embodiments, the media guidance application receives a request from the user expressing a preference for the second source instead of the first source and the media guidance application replaces duplicate results between the first and second subset from the first subset instead of the second subset. Specifically, the media guidance application receives a second user input (e.g., of arrow 126 or arrows 128) indicating a second preference for the second source over the first source. For example, the media guidance application, when generating the grid with the search results from the first and second results for display, may include selectable options (e.g., arrow 126 and arrows 128) to swap a row with results from one source (e.g., source 104) with another row with results from another source (e.g., source 106). The media guidance application may receive a user selection of one of the selectable options (e.g., arrow 126) to elevate the second row with results from the second source (e.g., source 106) above the first row with results from the first source (e.g., source 104). For example, the user may select (e.g., via a user input interface such as a remote control) an arrow graphic (e.g., arrow 126) pointing downwards and determine that the user selection is a request to swap the first and second rows. The media guidance application may store (e.g., in a user profile) the new user preference for the second source (e.g., source 106) over the first source (e.g., source 104) for use when generating future grids with search results from the two sources.

The media guidance application, in response to receiving the second user input, swaps the rows where the first and second search results are displayed and determines whether duplicates from the less preferred source (e.g., now source 104) exist with the more preferred source (e.g., now source 106). Specifically, the media guidance application generates a third subset of the second search results by replacing the third result in the modified second subset with the second result. For example, now that the second source is preferred over the first source, results from the second source are preferred. Thus, the second result (e.g., that matches result 112 from source 104) may be added back into the second subset to create a new third subset of results to display. The media guidance application may generate a new list or other data structure with identifiers of each result that is part of the third subset, or modify an existing list or other data structure for the second subset. In some embodiments, the second result replaces the third result (e.g., replaces one of results 118, 120, and 122). In other embodiments, another result previously in the subset is removed and both the second and third results are in the third subset.

The media guidance application generates a fourth subset of the first search results by replacing the first result in the first subset with a fourth result of the first search results, wherein the fourth result is not in the first subset. For example, now that the second source (e.g., source 106) is preferred over the first source (e.g., source 104), results from the first source that match results of the second source need to be replaced with other results in the same manner as discussed above. Thus, the first result (e.g., result 112) may be replaced with a fourth result of the first results that does not match any of the results in the third subset (e.g., based on comparing metadata as discussed above). The media guidance application may generate a new list or other data structure with identifiers of each result that is part of the fourth subset, or modify an existing list or other data structure for the first subset. The media guidance application then generates for display the third subset in the first row instead of the first subset and the fourth subset in the second row instead of the modified second subset. For example, the media guidance application may generate indicators (e.g., text and/or graphics) associated with each result of the third subset in the first row and each result of the fourth subset in second row. In this way, duplicate results are still not presented, but since the second source is now preferred over the first source, duplicate results are replaced from the first results, not the second results.

Figure 2:
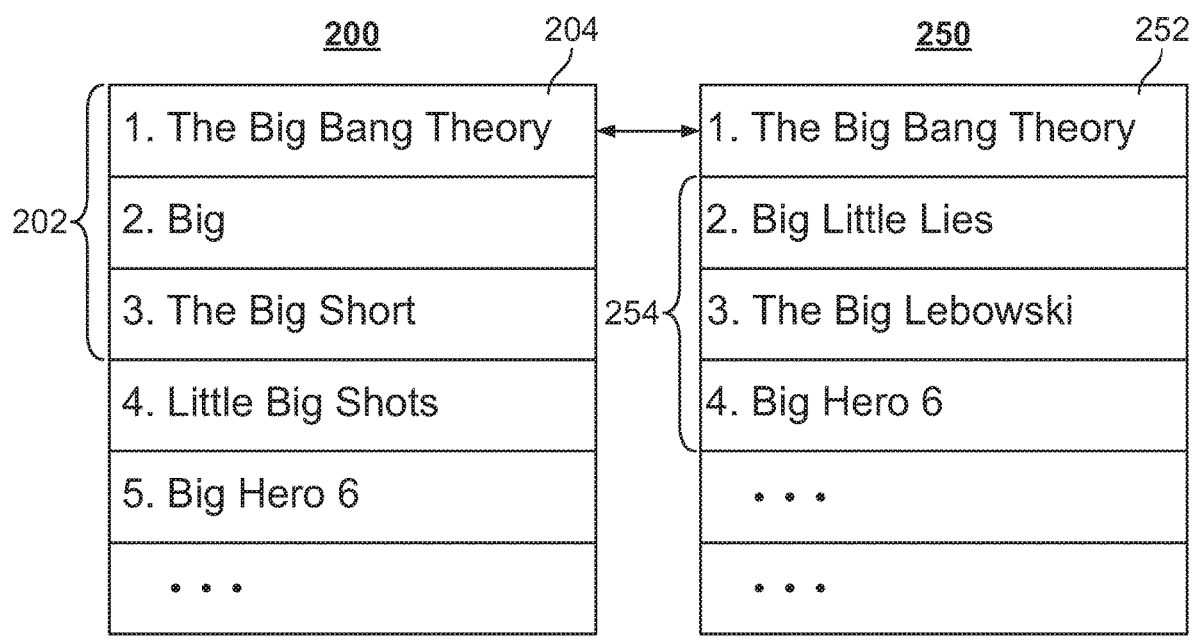
FIG. 2 shows an illustrative depiction of data structures containing search results from different sources, in accordance with some embodiments of the disclosure.

FIG. 2 shows an illustrative depiction of data structures containing search results from different sources, in accordance with some embodiments of the disclosure. For example, data structure 200 may be organized such that each entry (e.g., a row in a table) corresponds to a different result from the same source (e.g., source 104). Similarly, data structure 250 may be organized such that each entry (e.g., a row in a table) corresponds to a different result from the same source (e.g., source 106). The media guidance application may compare results in data structures 200 and 250 to determine which results match between two different sources. The media guidance application may determine which results to display in a grid, as discussed above with respect to FIG. 1, based on the comparison. For example, subset 202 of the results stored in data structure 200 is selected to be displayed. For example, subset 254 of the results stored in data structure 250 are selected to be displayed. For example, because result 204 and result 252 match, the media guidance application does not select result 254 as part of subset 254 to be displayed (e.g., because the source of the results in data structure 200 is preferred over the source of the results in data structure 250). The results in data structures 200 and 250 may be ranked according to a variety of factors, as discussed further below and with respect to FIG. 10. Data structures 200 and 250 may be stored in memory (e.g., storage as described in FIG. 6) on one or more user devices (e.g., any of the devices listed in FIGS. 6-7 below). Moreover, the media guidance application may use one or more of the processes described in FIGS. 8-12 below to generate data structures 200 and 250 or any of the features described therein.

In some embodiments, the media guidance application may retrieve metadata from a database and compare the characters of the retrieved metadata to determine whether two results match. Specifically, the media guidance application compares a first identifier of the first result and a second identifier of the second result with a plurality of identifiers stored in a database. The identifier may be any combination of characters that define the results, such as a title associated with the result, a URL, and/or a numerical value (e.g., a serial code). For example, the media guidance application may access the database stored locally in storage or at a remote server via a communications network. The database may be organized as a series of multiple linked tables (e.g., a relational database), where a plurality of identifiers in a first table are each associated with a pointer to another table containing metadata associated with the identifier. For example, the media guidance application may compare characters of the first and second identifier (e.g., identifiers of results 204 and 252) with the stored plurality of identifiers. The media guidance application determines that a first stored identifier matches the first identifier and a second stored identifier matches the second identifier. For example, the media guidance application may determine that a first stored identifier matches the first identifier (e.g., identifier of result 204) and a second stored identifier matches the second identifier (e.g., identifier of result 252). The media guidance application may then access the appropriate linked tables based on pointers in fields corresponding to the first stored identifier and the second stored identifier.

The media guidance application retrieves first metadata from a first field associated with the first stored identifier and second metadata from a second field associated with the second stored identifier. For example, the tables containing metadata associated with each stored identifier (e.g., associated with results 204 and 254) may be structured so that metadata in a first field of each table is always a title associated with the result, metadata in a second field of each table is always a director, etc., for easier comparison (e.g., metadata for the same attribute can be compared without having to compare each stored value to every stored value associated with another identifier). Alternatively or additionally, the table may be structured such that each field with metadata is associated with a label, such as "ACTOR" which can be used to compare corresponding metadata associated with different identifiers. The media guidance application may retrieve metadata from a first field associated with the first identifier (e.g., a title) and metadata from a second field associated with the second identifier (e.g., also a title). The media guidance application then compares first characters of the first metadata associated with the first result with second characters of the second metadata associated with the second result. For example, the media guidance application may compare each character of a retrieved string of characters associated with the first result (identified by the first identifier) with characters of a retrieved string of characters associated with the second result (identified by the second identifier).

In some embodiments, the media guidance application determines which results to select based on a relevance ranking of results from each source. Specifically, the media guidance application ranks each result in the first search results and each result in the second search results based on a relevance of each result to the user input. For example, the media guidance application may receive search results from a source (e.g., data structure 200) that are already ranked in terms of popularity (e.g., based on the number of times users have clicked particular links) and/or character matching (e.g., how many characters of a search query submitted by the user matched characters of a result). In this situation, the media guidance application may further rank the results based on user preferences (e.g., elevate certain results based on user preferences for those results) or may simply retrieve the highest ranked results (e.g., a result indexed "1" such as result 204) without further ranking. If the results received from a source are unranked and are only ranked based on similarity to the user's query, the media guidance application may, for each result, determine a relative popularity. For example, the media guidance application may compare an identifier of each result (e.g., an identifier of result 204) with popularities stored in a data structure (either local in storage or at a remote server). The media guidance application may then rank the results received from a source based on the retrieved popularity values. For example, the popularity values may be Nielsen ratings of television shows.

The media guidance application retrieves a highest ranked result in the first search results as the first result in the first subset. For example, the media guidance application may retrieve the highest ranked result (e.g., result 204 may be indexed in data structure 200 as the highest ranked result) of the ranked first search results as the first result. The media guidance application may continue retrieving the number of results that fit in the first row (e.g., as discussed above) by retrieving a next highest ranked result from the first search results (e.g., from data structure 200). The media guidance application retrieves a highest ranked result in the second search results as the second result in the second subset. For example, the media guidance application may retrieve the highest ranked result of the second search results (e.g., result 252 may be indexed as the highest ranked result in data structure 250) as the second result. The media guidance application may continue retrieving the number of results that fit in the second row (e.g., as discussed above) by retrieving a next highest ranked result from the second search results.

In some embodiments, the media guidance application modifies the second subset by replacing the second result with a next highest ranked result. Specifically, the media guidance application retrieves a next highest ranked result not in the second subset as the third result. For example, the media guidance application may retrieve a result from a list of ranked results (e.g., either received from the source of the search results or generated by the media guidance application as discussed above) that is the highest ranked result not part of the second subset. As a specific example, if the top ranked result of the second subset (e.g., result 252) matches a result (e.g., result 204) in the first subset and three results need to be displayed from the second source (e.g., three results need to be retrieved from data structure 250), the media guidance application may select results ranked 2-4 (e.g., subset 254) instead of 1-3 to display. The media guidance application may further determine whether the retrieved next highest ranked result matches a result in the first subset (e.g., by comparing metadata as discussed above). For example, if the media guidance application determines that the next highest ranked result matches a result in the first subset, the media guidance application may retrieve another result (e.g., one result lower on a ranked list) until a result does not match one of the first subset.

The media guidance application may remove the second result from the second subset. For example, the media guidance application may remove an identifier associated with the second result (e.g., result 252) from a list or other data structure storing identifiers of the second subset. The media guidance application may then add the third result to the second subset. For example, the media guidance application may add an identifier of the next highest ranked result (that doesn't match any of the results in the first subset) to the list or other data structure. The media guidance application may add the identifier to the same field previously populated by the identifier of the second result that was removed, or may reorder the identifiers (e.g., based on popularity). In some embodiments, the media guidance application uses the order of the identifiers stored in the list or other data structure as the order the identifiers are presented to the user in the rows.

In some embodiments, the media guidance application modifies the second subset by replacing the second result with a result that matches a user preference. Specifically, the media guidance application retrieves a second user preference for an attribute of search results. For example, the media guidance application may retrieve a user profile containing a plurality of user preferences. The media guidance application may retrieve preferences from the user profile. For example, the media guidance application may retrieve that the user enjoys movies that include actor "Matt Damon." The media guidance application may compare a retrieved user preference with metadata associated with each result of the search results from a source (e.g., each result in data structure 250). For example, the media guidance application may retrieve metadata associated with a result from local storage or a remote server.

The media guidance application may then determine for each result whether the user preference matches metadata associated with each result (e.g., based on character comparison). In some embodiments, the media guidance application compares every user preference in the user profile to metadata associated with the results and ranks the results based on how many user preferences match metadata associated with each result. For example, if both an actor and a genre of a result match user preferences, the result (e.g., result 252) may be ranked higher than another result where only the actor associated with the result matches a user preference. In some embodiments, the media guidance application may weight certain user preferences higher (e.g., based on an indication stored in the user profile) when determining which result to replace the second result with. For example, the media guidance application may determine that a retrieved user preference for "action movies" is a "low preference" to the user based on the user designating it as such. In contrast, the media guidance application may determine that a retrieved user preference for "Matt Damon" is a "high preference" to the user.

The media guidance application, in response to determining that the attribute of the third result matches the second user preference, removes the second result from the second subset. For example, the media guidance application may remove an identifier associated with the second result (e.g., result 252) from a list or other data structure storing identifiers of the second subset. The media guidance application may then add the third result to the second subset. For example, the media guidance application may add an identifier of the result that matches (or most closely matches) the user preference(s) to the list or other data structure (e.g., another result from data structure 250). The media guidance application may add the identifier to the same field previously populated by the identifier of the second result that was removed, or may reorder the identifiers (e.g., based on popularity). In some embodiments, the media guidance application uses the order of the identifiers stored in the list or other data structure as the order the identifiers are presented to the user in the rows.

Figure 3:
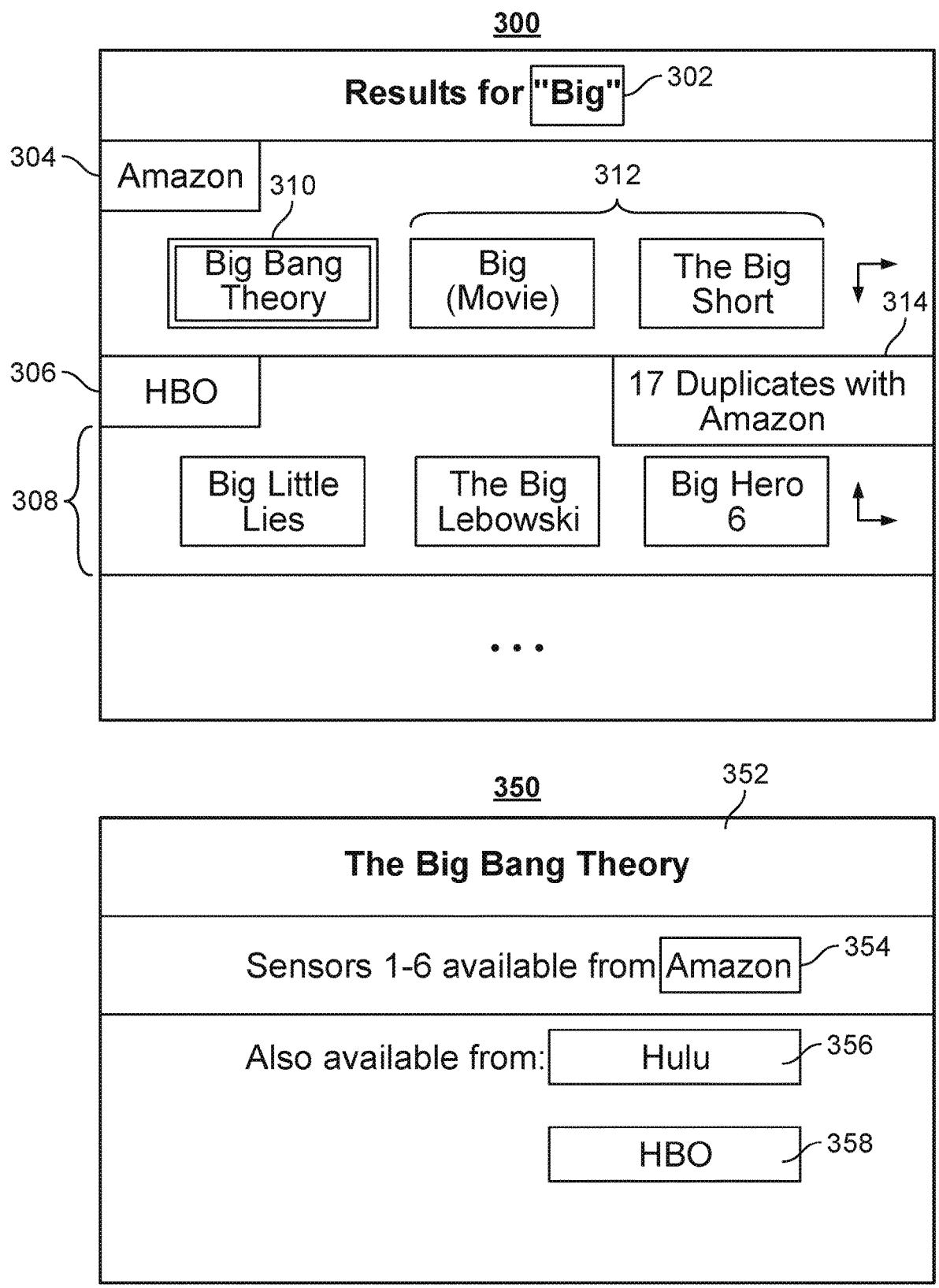
FIG. 3 shows another illustrative display showing search results from a plurality of sources in a grid, in accordance with some embodiments of the disclosure.

FIG. 3 shows another illustrative example of a display showing search results from a plurality of sources in a grid, in accordance with some embodiments of the disclosure. For example, display 300 may be coupled to user equipment which executes a media guidance application in order to display search results relating to user query 302. User query 302 may be received via a user input interface coupled to the same user equipment displaying display 300 or other user equipment. Display 300 includes a grid comprising rows for sources 304 and 306. Each row for a source (e.g., source 304 or source 306) contains a subset of the results from the source. For example, selected result 310 and results 312 are displayed from source 304 and results 308 are displayed from source 306. Source 304 and source 306 may include the same result (e.g., result 312 is part of the subsets to be displayed from both sources), as discussed above with respect to FIGS. 1-2. In response, the media guidance application may remove the duplicate result from the source that the user prefers less (e.g., from source 306). Display 300 may visually distinguish (e.g., via highlighting) a result currently navigated to by the user (e.g., selected result 310) from other results (e.g., results 312). Display 300 may include number of duplicates 314. Number of duplicates 314 visually indicates (e.g., using text or graphics) the number of results from source 306 that match results from source 304 to the user. Display 300 may appear on one or more user devices (e.g., any of the devices listed in FIGS. 6-7 below). Moreover, the media guidance application may use one or more of the processes described in FIGS. 8-12 to generate display 300 or any of the features described therein.

Upon receiving a user selection to receive more information about selected result 310, the media guidance application may generate display 350. Display 350 may be overlaid on display 300 or may replace display 300. Display 350 may include identifier 352 associated with result 310. Display 350 may include an indication and associated link 354 associated with result 310 from source 304. Display 350 may additionally include other sources from which a duplicate result was received. For example, a result identical to result 310 (e.g., determined as discussed above with respect to FIGS. 1-2) may be received from other sources. Accordingly, link 356 and link 358 are displayed as part of display 350 to provide the user with other options to access data associated with the result. Display 350 may appear on one or more user devices (e.g., any of the devices listed in FIGS. 6-7 below). Moreover, the media guidance application may use one or more of the processes described in FIGS. 8-12 to generate display 350 or any of the features described therein.

In some embodiments, the media guidance application determines the total number of duplicate results received from the first and second sources and displays the number to the user. Specifically, the media guidance application compares each result of the first search results with each result of the second search results. For example, the media guidance application may compare metadata associated with each result of the first search results (e.g., from source 304) with metadata of each search result received from the second source (e.g., from source 306). For example, the media guidance application may execute a program script utilizing a for-loop to iteratively compare each result from the first source with each result from the second source. The media guidance application then determines, based on comparing each result of the first search results with each result of the second search results, a number of duplicate results between the first search results and the second search results. For example, the media guidance application may initialize a counter and increment the counter each time a match is determined between a result from the first source and a result from the second source until every result from the first source has been compared to the search results from the second source. As discussed above, the media guidance application may determine a match if a threshold percentage of metadata associated with two search results match. The media guidance application then generates for display an indication of the number of duplicate results (e.g., number of duplicates 314) in the second row. For example, the media guidance application may generate for display text with the value for the total number of duplicates (e.g., "30") in the first row or the second row. The indication may optionally contain text clarifying which source the duplicates refer to. For example, if AMAZON® is the source for the first row and HULU® is the source for the second row, the media guidance application may generate text, "30 duplicate sources with Amazon" in the second row.

In some embodiments, the media guidance application may display other sources that returned the same result upon receiving a user selection of the result. Specifically, the media guidance application receives a user selection of the first result. For example, the media guidance application may, via user input interface such as a remote control or touchscreen interface, receive a selection of a particular result displayed on the grid. As a specific example, the media guidance application may determine that the result for "The Big Bang Theory" in the first row (e.g., selected result 310) has been selected by the user. The media guidance application may determine other sources where a result for "The Big Bang Theory" was received by comparing metadata associated with the selected result to results from other sources, as discussed above. For example, the media guidance application may determine that the second result (e.g. from source 306) matches the first result (e.g., selected result 310 from source 304) and that the first source is selected by the user. The media guidance application, in response to receiving the user selection, generates for display an indication that the first result is also available from the second source. For example, if both the first and the second search results include a result for "The Big Bang Theory," upon a user selecting "The Big Bang Theory" result in the first row containing the first search results, the media guidance application may generate for display an indication (e.g., link 356) that the result was also returned by the second source. As a specific example, the media guidance application may generate for display text, "This result was also returned by HULU®." In this way, the media guidance application may provide the user with alternate sources (e.g., links 356 and 358) where a result is available without having to show the same result in each row.

In some embodiments, the results identify media assets and the media guidance application presents selectable options to perform actions related to the media assets. Specifically, the media guidance application receives a user selection of the first result. For example, the media guidance application may, via user input interface such as a remote control or touchscreen interface, receive a selection of a particular result displayed on the grid (e.g., selected result 310). As a specific example, the media guidance application may determine that the result for "The Big Bang Theory" in the first row (e.g., the most preferred source of the user) has been selected by the user. The media guidance application, in response to receiving the user selection, generates for display a plurality of selectable options associated with the media asset (e.g., overlaid on display 300 or part of display 350). The plurality of options may include an option to add the media asset to a watch list. For example, upon selection of the option to add the media asset to the watch list by the user, the media guidance application may store an identifier associated with the media asset in a data structure that includes identifiers of media assets the user desires to watch at some future time.

The plurality of options may include an option to add the media asset to a favorites list. For example, upon selection of the option to add the media asset to the favorites list by the user, the media guidance application may store an identifier associated with the media asset in a data structure that includes identifiers of media assets the user likes. In some embodiments, the favorites list may be used for determining user preferences for particular results when determining which result to replace a duplicate result with, as discussed above. The plurality of options may include an option to view upcoming times the media asset is available. For example, upon selection of the option to view upcoming times the media asset is available by the user, the media guidance application may query a media guidance database (e.g., stored locally in storage or at a remote server) for times and sources that the media asset is available from. The media guidance application may then generate for display the times and sources that the media asset is available from.

The plurality of options may include an option to record the media asset. For example, upon selection of the option to record the media asset by the user, the media guidance application may determine whether the media asset is available from a source during a certain period of time. If the media asset is available, the media guidance application may schedule a recording (e.g., by adding an identifier of the media asset and the source and time that the media asset is available to a scheduling data structure). If the media asset is not available, the media guidance application may add the media asset to the watch list, as discussed above.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
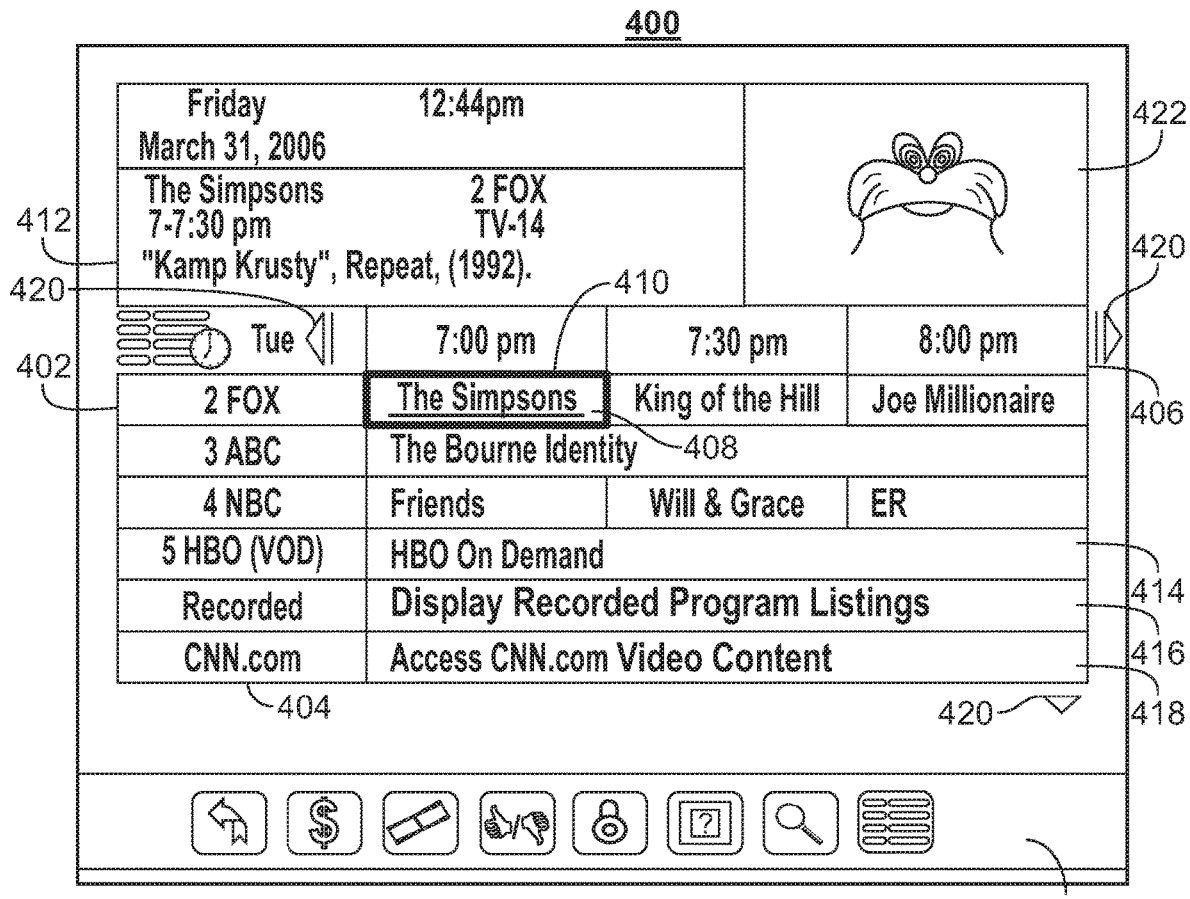
FIG. 4 shows an illustrative example of a display screen for use in accessing media content in accordance with some embodiments of the disclosure.
Figure 5:
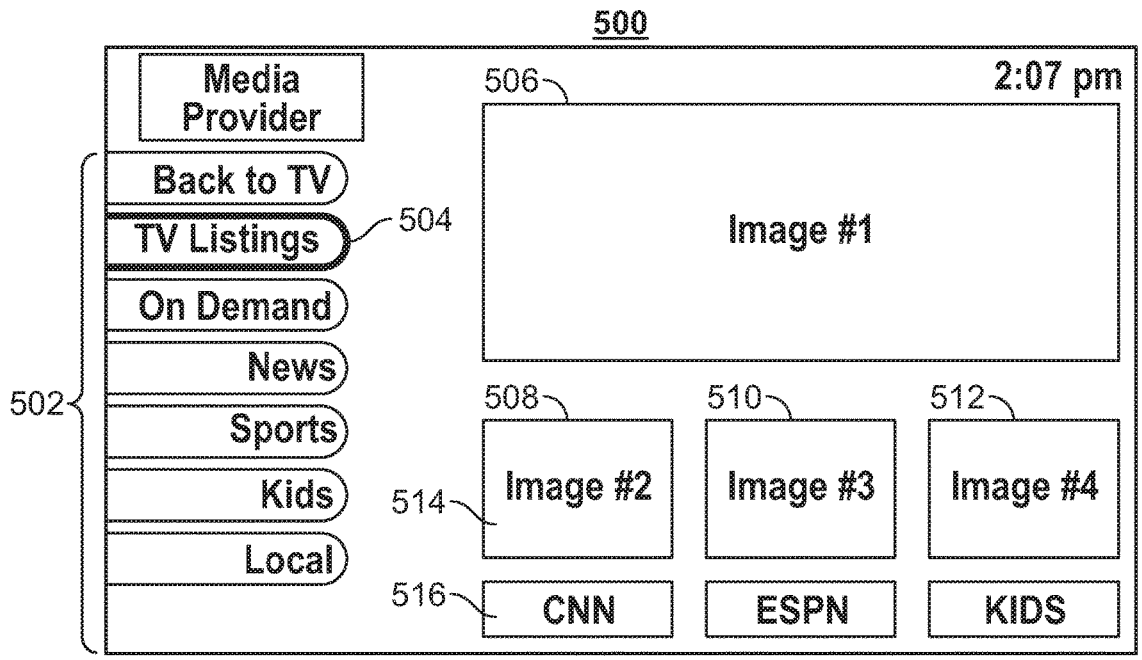
FIG. 5 shows another illustrative example of a display screen used access media content in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listings associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
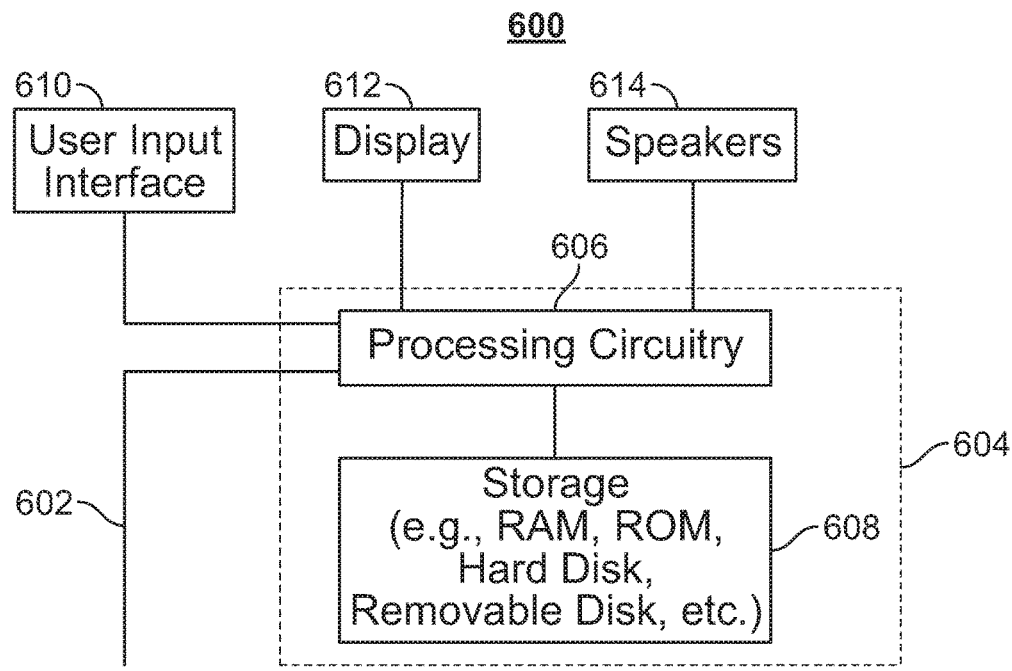
FIG. 6 is a block diagram of an illustrative user equipment device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
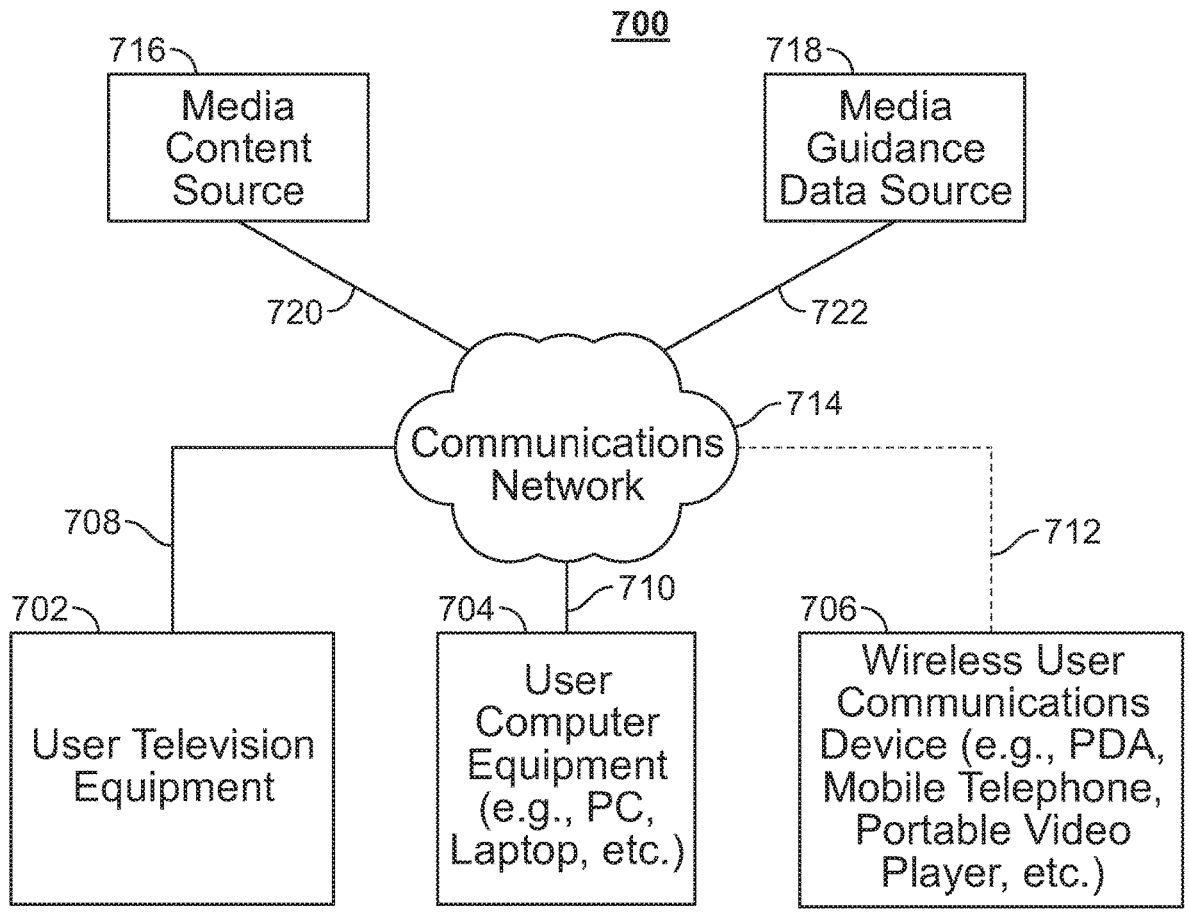
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE®, NETFLIX®, and HULU®, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
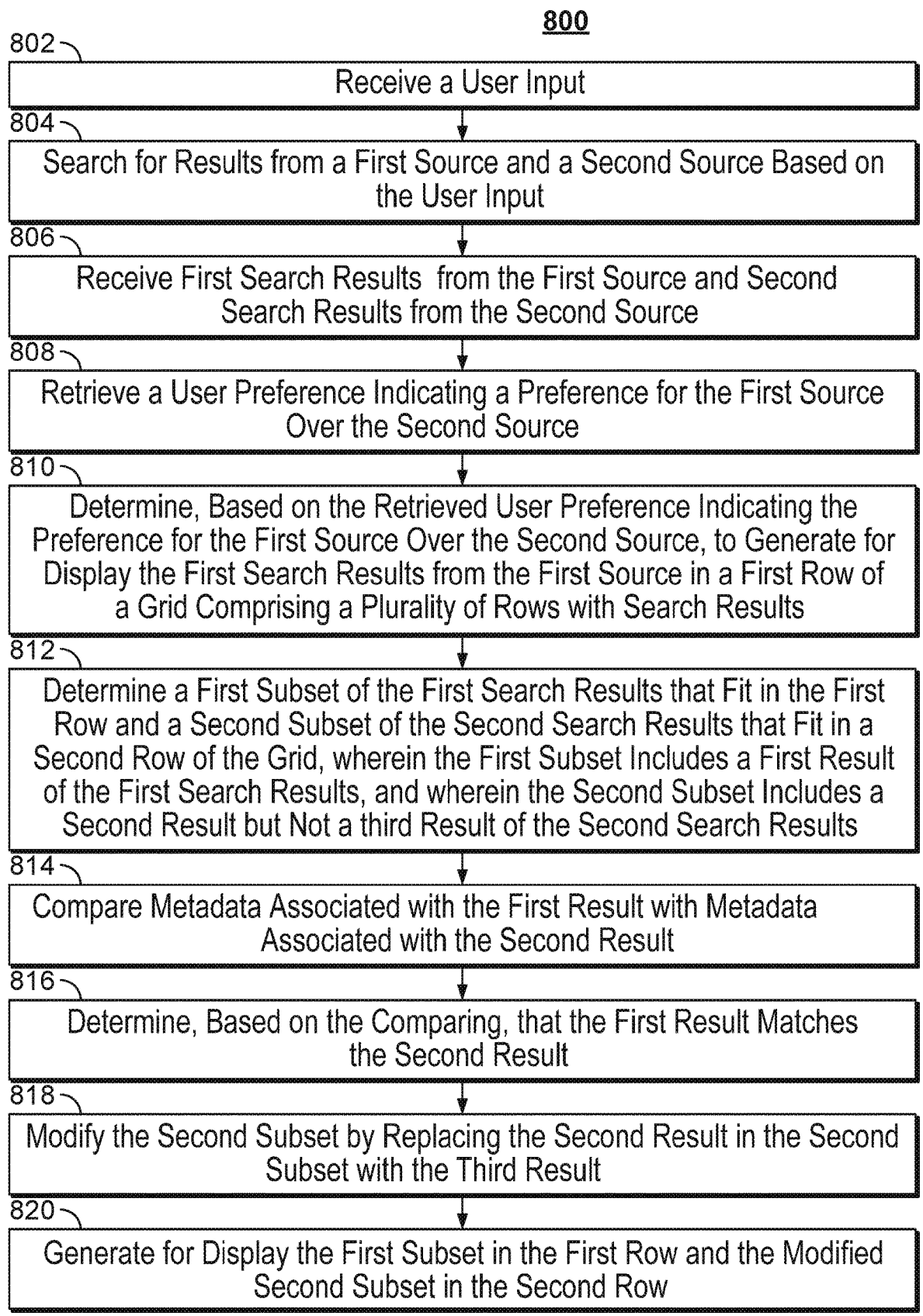
FIG. 8 is a flowchart of illustrative steps for presenting search results from a plurality of sources, in accordance with some embodiments of the disclosure.

FIG. 8 is a flowchart of illustrative steps for presenting search results from a plurality of sources, in accordance with some embodiments of the disclosure. For example, a media guidance application implementing process 800 may be executed by control circuitry 604 (FIG. 6). It should be noted that process 800 or any step thereof could be performed on, or provided by, any of the devices shown in FIGS. 6-7.

Process 800 begins at 802, where the media guidance application receives (e.g., via control circuitry 604 (FIG. 6)) a user input. For example, the media guidance application may receive (e.g., via control circuitry 604 (FIG. 6)) a user input via a user input interface (e.g., user input interface 610 (FIG. 6)). The user input may be a string of one or multiple alphanumeric or other characters. Alternatively or additionally, the user input may be selecting one of a plurality of selectable options with common search queries. For example, the media guidance application may present (e.g., via control circuitry 604 (FIG. 6)) the most commonly searched keywords as selectable options for the user to select, saving the user time that he or she may have to input the characters.

Process 800 continues to 804, where the media guidance application searches (e.g., via control circuitry 604 (FIG. 6)) for results from a first source and a second source based on the user input. For example, the media guidance application may transmit (e.g., via control circuitry 604 (FIG. 6)) the user input to the first source and the second source (e.g., to content source 716 via communications network 714 (FIG. 7)). For example, the media guidance application may generate a data packet including the user input (e.g., a string of characters) and/or other parameters for the search (e.g., results should be during a certain time period). In some embodiments, the media guidance application may utilize an API from one or both of the sources to transmit (e.g., via control circuitry 604 (FIG. 6)) a search query (e.g., based on the user input). The media guidance application may determine (e.g., via control circuitry 604 (FIG. 6)) the sources to transmit the user input to, based on user preferences (e.g., stored locally in storage 608 (FIG. 6) or remotely at media guidance data source 718 accessible via communications network 714 (FIG. 7)) for specific sources. For example, the user may store a preference that search queries should be sent to a particular set of sources (e.g., to AMAZON® and HULU®). Alternatively or additionally, the media guidance application may generate (e.g., via control circuitry 604 (FIG. 6)) a graphical user interface at the time of the user input allowing the user to select sources. For example, the media guidance application may generate (e.g., via control circuitry 604 (FIG. 6)) a field where the user can enter (e.g., via user input interface 610 (FIG. 6)) a string of characters (e.g., the user input) and a series of selectable options for sources to search for results.

Process 800 continues to 806, where the media guidance application receives (e.g., via control circuitry 604 (FIG. 6)) first search results from the first source and second search results from the second source. For example, the media guidance application may receive (e.g., via control circuitry 604 (FIG. 6)) a plurality of results that match the user input from both sources (e.g., from content source 716 (FIG. 7)). The results from each source may be received (e.g., via control circuitry 604 (FIG. 6)) by the media guidance application in separate tables, where each table contains a plurality of rows, each with an identifier of a matching result (e.g., the title of a media asset) and additional information in associated fields (e.g., an actor in a media asset). In some embodiments, the results may be ranked according to popularity. Alternatively or additionally, the results may be ranked according to relevance to the user input. For example, despite "The Big Bang Theory" being the most popular result (e.g., many users click on it), because the user input is "Bang," the result "Bangerz," an album by Miley Cyrus, may be ranked higher because the first word is matched to the query. Alternatively or additionally, the media guidance application may reorder (e.g., via control circuitry 604 (FIG. 6)) the results based on any combination of the factors discussed above, as well as based on user preferences. For example, if the media guidance application retrieves (e.g., via control circuitry 604 (FIG. 6)) a user preference (e.g., stored locally in storage 608 (FIG. 6) or remotely at media guidance data source 718 accessible via communications network 714 (FIG. 7)) that the user likes movies with a given actor, results with that actor may be elevated in the ranking.

Process 800 continues to 808, where the media guidance application retrieves (e.g., via control circuitry 604 (FIG. 6)) a user preference indicating a preference for the first source over the second source. For example, the media guidance application may retrieve (e.g., via control circuitry 604 (FIG. 6)) a user profile stored locally (e.g., in storage 608 (FIG. 6)) or remotely at a server (e.g., at media guidance data source 718 accessible via communications network 714 (FIG. 7)). The media guidance application may retrieve (e.g., via control circuitry 604 (FIG. 6)) search preferences from the user profile, as described further below with respect to FIG. 9. For example, the media guidance application may store (e.g., via control circuitry 604 (FIG. 6)) a ranking of sources set by the user. As a specific example, the media guidance application may generate a graphical user interface (e.g., on display 612 (FIG. 6)) where the user can drag and drop sources (e.g., HULU®, AMAZON®, etc.) into a particular order to reflect his or her preferences. The media guidance application may then store (e.g., in an array) the rank and an identifier of each source. The media guidance application may retrieve (e.g., via control circuitry 604 (FIG. 6)) the stored ranks of sources set by the user and determine respective ranks of the first and second sources. For example, the media guidance application may determine (e.g., via control circuitry 604 (FIG. 6)) that HULU®, identified by the string of characters "hulu", is associated with a ranking of "5". If the ranking for AMAZON® is "3", the media guidance application may determine (e.g., via control circuitry 604 (FIG. 6)) that the user prefers AMAZON® to HULU®.

Process 800 continues to 810, where the media guidance application determines (e.g., via control circuitry 604 (FIG. 6)), based on the retrieved user preference indicating the preference for the first source over the second source, to generate for display the first search results from the first source in a first row of a grid comprising a plurality of rows with search results. For example, the media guidance application may determine (e.g., via control circuitry 604 (FIG. 6)) a particular location (e.g., a row) to generate results from the first source in. In some embodiments, the row may be located at a row closer to the top of the screen (e.g., display 612 (FIG. 6)) than a second row where results from the second source are presented.

Process 800 continues to 812, where the media guidance application determines (e.g., via control circuitry 604 (FIG. 6)) a first subset of the first search results that fit in the first row and a second subset of the second search results that fit in a second row of the grid, wherein the first subset includes a first result of the first search results, and wherein the second subset includes a second result but not a third result of the second search results. For example, the media guidance application may determine (e.g., via control circuitry 604 (FIG. 6)) a number of results that fit in the first row and the second row. The number may be constant (e.g., each row always contains 3 results) or may vary based on the length of identifiers of the results (e.g., results with a large number of characters take up more space and fewer can be displayed at once). In some embodiments, the number may be different for the first row and the second row. For example, by virtue of being preferred based on the user preference, more results may be displayed for the first row (e.g., the first row may take up more display space and display results in two sub-rows) than the second row. The media guidance application may then select (e.g., via control circuitry 604 (FIG. 6)) the appropriate number of results from the received search results from the two sources to display (e.g., the first and second subsets), as described further below with respect to FIG. 10. The first subset may include a first result that matches a second result in the second subset. For example, "The Big Bang Theory" may be present in the first and second subsets. In order to present non-duplicate results to the user, the media guidance application may select (e.g., via control circuitry 604 (FIG. 6)) a third result of the second search results that does not match one of the results in the first subset instead of the second result.

Process 800 continues to 814, where the media guidance application compares (e.g., via control circuitry 604 (FIG. 6)) metadata associated with the first result with metadata associated with the second result. For example, the media guidance application may retrieve (e.g., via control circuitry 604 (FIG. 6)) metadata associated with a result locally from storage (e.g., storage 608 (FIG. 6)) or a remote server (e.g., media guidance data source 718 accessible via communications network 714 (FIG. 7)). The media guidance application may, alternatively or additionally, receive (e.g., via control circuitry 604 (FIG. 6)) the metadata in fields of a table associated with the results received from a source (e.g., content source 716 (FIG. 7)). The metadata may be any data related to the result that describes content associated with the result. For example, if the result is for a news article, the metadata may include the author of the article, type of the article (e.g., opinion), and/or publication name (e.g., Nature). The media guidance application may execute (e.g., via control circuitry 604 (FIG. 6)) a program script to iteratively compare characters of metadata (e.g., attributes) of two results to determine whether the two results match. For example, the media guidance application may compare (e.g., via control circuitry 604 (FIG. 6)) the string of characters "Matt Damon," associated with the first result, with the string of characters "Matt Dillon," associated with the second result.

Process 800 continues to 816, where the media guidance application determines (e.g., via control circuitry 604 (FIG. 6)), based on the comparing, that the first result matches the second result. For example, the media guidance application may determine (e.g., via control circuitry 604 (FIG. 6)) that if each character of a specific attribute associated with the first result matches each character of the corresponding attribute associated with the second result that the two results match. For example, if two results contain metadata referring to actor "Matt Damon," the media guidance application may determine (e.g., via control circuitry 604 (FIG. 6)) the metadata matches and thus the two results match. Alternatively or additionally, the media guidance application may determine (e.g., via control circuitry 604 (FIG. 6)) whether all the metadata (e.g., all the attributes) associated with the first result, or a threshold percentage (e.g., 50%), match corresponding metadata of the second result, as described further with respect to FIG. 11. For example, if the media guidance application determines (e.g., via control circuitry 604 (FIG. 6)) the title, director, and genre attributes match between two results, the media guidance application may determine that the two results match with greater confidence than if only one attribute matched.

Process 800 continues to 818, where the media guidance application modifies (e.g., via control circuitry 604 (FIG. 6)) the second subset by replacing the second result in the second subset with the third result. For example, upon determining that two results that are to be displayed at the same time match (e.g., they are in the first and second subsets), the media guidance application replaces (e.g., via control circuitry 604 (FIG. 6)) the result of the source that the user does not prefer with another result. For example, if "The Big Bang Theory" is a result from both the first and second sources (e.g., source 716 (FIG. 7)) and in the first and second subsets, the result in the second subset may be replaced with another result. As discussed further above with respect to FIGS. 1-2, the result that replaces the second result may be based on user preferences or based on a ranking of each result in the search results from the second source.

Process 800 continues to 820, where the media guidance application generates (e.g., via control circuitry 604 (FIG. 6)) for display the first subset in the first row and the modified second subset in the second row. For example, the media guidance application may generate (e.g., via control circuitry 604 (FIG. 6)) identifiers of each result in the first subset in the first row. As a specific example, the identifiers may be text or graphics that identify each result. The media guidance application may receive (e.g., via control circuitry 604 (FIG. 6)) the identifiers from the sources, or may retrieve them from local storage (e.g., storage 608 (FIG. 6)) or a remote server (e.g., at media guidance data source 718 accessible via communications network 714 (FIG. 7)). The media guidance application may similarly generate (e.g., via control circuitry 604 (FIG. 6)) identifiers of each result in the modified second subset (e.g., where the third result has replaced the second result) in the second row.

Figure 9:
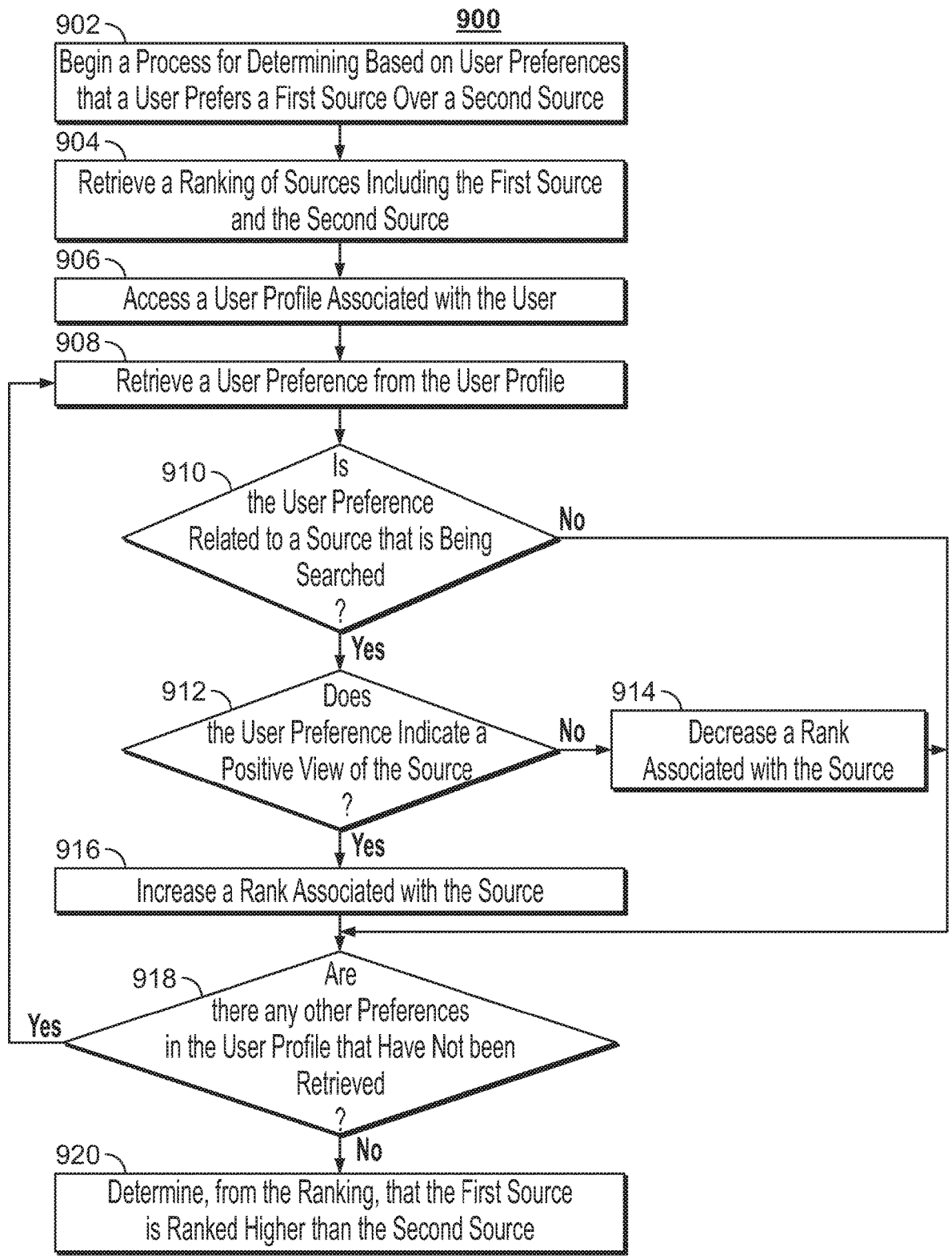
FIG. 9 is a flowchart of illustrative steps for determining, based on user preferences, that a user prefers a first source over a second source, in accordance with some embodiments of the disclosure.

FIG. 9 is a flowchart of illustrative steps for determining, based on user preferences, that a user prefers a first source over a second source, in accordance with some embodiments of the disclosure. For example, a media guidance application implementing process 900 may be executed by control circuitry 604 (FIG. 6). It should be noted that process 900 or any step thereof could be performed on, or provided by, any of the devices shown in FIGS. 6-7. Process 900 starts at 902, where the media guidance application begins (e.g., via control circuitry 604 (FIG. 6)) a process for determining, based on user preferences, that a user prefers a first source over a second source. For example, the media guidance application may initialize the necessary variables and execute (e.g., via control circuitry 604 (FIG. 6)) a program script calling a particular method to execute process 900.

Process 900 continues to 904, where the media guidance application retrieves (e.g., via control circuitry 604 (FIG. 6)) a ranking of sources including the first source and the second source. For example, the media guidance application may retrieve (e.g., via control circuitry 604 (FIG. 6)) from local storage (e.g., storage 608 (FIG. 6)) or a remote server (e.g., media guidance data source 718 accessible via communications network 714 (FIG. 7)) a list or other data structure containing identifiers of sources and an associated rank. In some embodiments, the rank may be based on the index (e.g., a value store in index 0 of an array is the highest ranked source). In other embodiments, the rank may be stored in a separate field associated with the identifier. The retrieved list or other data structure may represent a default ranking of sources (e.g., based on overall popularity of the sources).

Process 900 continues to 906, where the media guidance application accesses (e.g., via control circuitry 604 (FIG. 6)) a user profile associated with the user. For example, the media guidance application may access (e.g., via control circuitry 604 (FIG. 6)) a user profile stored in local storage (e.g., storage 608 (FIG. 6)) or a remote server (e.g., media guidance data source 718 accessible via communications network 714 (FIG. 7)). The media guidance application may transmit (e.g., via control circuitry 604 (FIG. 6)) a data packet containing an identifier of the user and/or a passcode to authenticate the user's identity and access the user profile.

Process 900 continues to 908, where the media guidance application retrieves (e.g., via control circuitry 604 (FIG. 6)) a user preference from the user profile. For example, the media guidance application may execute (e.g., via control circuitry 604 (FIG. 6)) a program script utilizing a database query language such as SQL to access and retrieve data in a particular field of the user profile. The media guidance application may retrieve (e.g., via control circuitry 604 (FIG. 6)) data from specific fields (e.g., determined to be relevant to sources the user likes, such as a favorite channels list associated with the user), a random subset of user preferences, or all user preferences from the user profile.

Process 900 continues to 910, where the media guidance application determines (e.g., via control circuitry 604 (FIG. 6)) if the user preference is related to a source that is being searched. For example, the media guidance application may compare (e.g., via control circuitry 604 (FIG. 6)) a retrieved user preference with a rule-set for determining whether the user preference relates to a source that is being searched. For example, the rule-set may include a rule that if a media asset was recently watched by a user (e.g., as stored in a viewing history of the user profile) from a particular source that is being searched, then the user preference relates to the particular source. As another example, the user profile may contain explicit preferences for sources (e.g., a user preference indicating he or she "does not like Amazon"). As another example, the user profile may contain messages transmitted by the user (e.g., through a social networking site) and may analyze the content of the messages to determine if an identifier of the source or associated with the source is part of a message.

If, at 910, the media guidance application determines that the user preference is related to a source that is being searched, process 900 continues to 912, where the media guidance application determines (e.g., via control circuitry 604 (FIG. 6)) whether the user preference indicates a positive view of the source. For example, the media guidance application may determine whether a user preference related to a source reflects a generally positive or negative view of the source. For example, the media guidance application may determine (e.g., via control circuitry 604 (FIG. 6)) that a user has viewed many media assets from source "HBO" in the past week and interpret the user's viewing habits as a positive view of the source. As another example, the media guidance application may determine (e.g., via control circuitry 604 (FIG. 6)) that a user has stopped watching media assets from AMAZON® and has not viewed a media asset from AMAZON® in over a month, which may be interpreted as a negative view of the source. The media guidance application may determine (e.g., via control circuitry 604 (FIG. 6)) whether a particular user preference is positive or negative based on comparing attributes associated with the user preference with stored attributes that indicate generally positive or negative views of sources. For example, the words "hate" and "cancel," not viewing a media asset for over a certain period of time from a source, demographic and/or political affiliation being generally adverse to content from the source, etc., may reflect a generally unfavorable view of a source.

If, at 912, the media guidance application determines that the user preference does not indicate a positive view of the source, process 900 continues to 914, where the media guidance application decreases (e.g., via control circuitry 604 (FIG. 6)) a rank associated with the source. For example, the media guidance application may determine (e.g., via control circuitry 604 (FIG. 6)) a weight associated with the positive view (e.g., based on how positive the view is) and adjust the ranking of the source accordingly. For example, a very favorable preference for a source (e.g., based on a rule-set, as discussed above) may result in the media guidance application adjusting (e.g., via control circuitry 604 (FIG. 6)) the ranking associated with the source to be multiple places higher than it previously was. Process 900 then continues to 918, discussed below.

If, at 912, the media guidance application determines that the user preference indicates a positive view of the source, process 900 continues to 916, where the media guidance application increases (e.g., via control circuitry 604 (FIG. 6)) a rank associated with the source. For example, the media guidance application may determine (e.g., via control circuitry 604 (FIG. 6)) a weight associated with the negative view (e.g., based on how negative the view is) and adjust the ranking of the source accordingly. For example, a mildly unfavorable preference for a source (e.g., based on a rule-set, as discussed above) may result in the media guidance application adjusting (e.g., via control circuitry 604 (FIG. 6)) the ranking associated with the source to be a single place lower than it previously was. Process 900 then continues to 918, discussed below.

If, at 910, the media guidance application determines that the user preference is not related to a source that is being searched, process 900 continues to 918, where the media guidance application determines (e.g., via control circuitry 604 (FIG. 6)) whether there are any other preferences in the user profile that have not been retrieved. For example, the media guidance application may execute a for-loop to iteratively retrieve every user preference (or every relevant user preference, as discussed above with respect to 908). The media guidance application may determine (e.g., via control circuitry 604 (FIG. 6)) that data in some fields of the user profile (e.g., containing user preferences) has not been retrieved based on the for-loop still running. The media guidance application may also store (e.g., via control circuitry 604 (FIG. 6)) a list of user preferences that have been retrieved and compare with user preferences in the user profile to determine if there are any other preferences that have not yet been retrieved.

If, at 918, the media guidance application determines that there are other preferences in the user profile that have not been retrieved, process 900 returns to 908, where the media guidance application retrieves (e.g., via control circuitry 604 (FIG. 6)) a user preference from the user profile. For example, the media guidance application may determine (e.g., via control circuitry 604 (FIG. 6)) that some user preferences have not yet been retrieved from the user profile (e.g., based on comparing retrieved preferences with preferences in the user profile) and the media guidance application may continue (e.g., via control circuitry 604 (FIG. 6)) to retrieve user preferences until all have been analyzed. In this way, the media guidance application may ensure that all user preferences are accounted for when determining whether a particular source should be ranked higher than another source.

If, at 918, the media guidance application determines that all the user preferences in the user profile have been retrieved, process 900 continues to 920, where the media guidance application determines (e.g., via control circuitry 604 (FIG. 6)), from the ranking, that the first source is ranked higher than the second source. For example, the media guidance application may retrieve (e.g., via control circuitry 604 (FIG. 6)) an identifier of the source that is ranked the highest (e.g., based on an associated field or an index) in a list or other data structure and determine that the retrieved identifier of the source represents the highest ranked source. The media guidance application may determine (e.g., via control circuitry 604 (FIG. 6)) that this source is ranked higher than other sources, thus, the user has a preference for this source over a second source.

Figure 10:
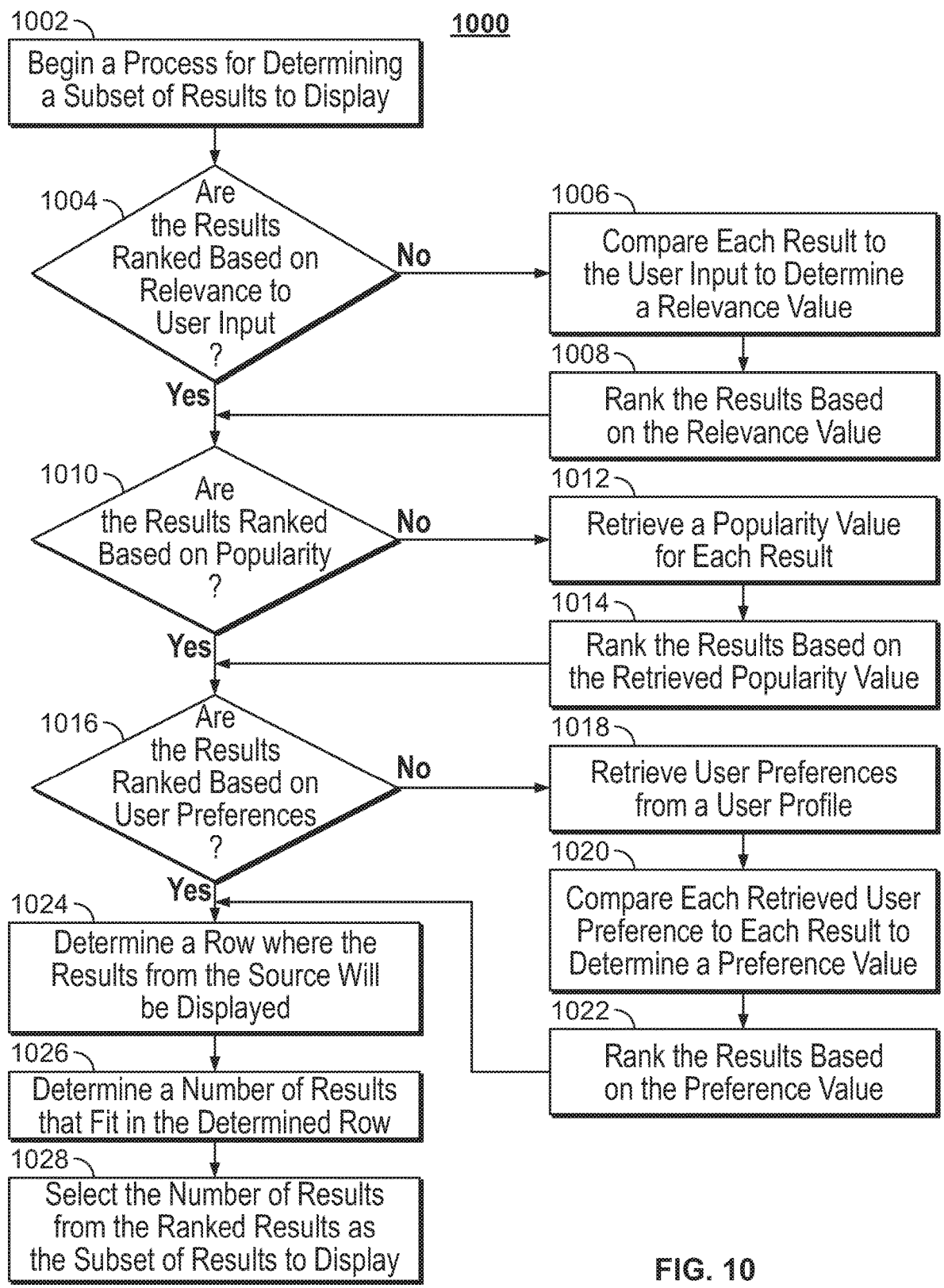
FIG. 10 is a flowchart of illustrative steps for determining a subset of results to display, in accordance with some embodiments of the disclosure.

FIG. 10 is a flowchart of illustrative steps for determining a subset of results to display, in accordance with some embodiments of the disclosure. For example, a media guidance application implementing process 1000 may be executed by control circuitry 604 (FIG. 6). It should be noted that process 1000 or any step thereof could be performed on, or provided by, any of the devices shown in FIGS. 6-7. Process 1000 starts at 1002, where the media guidance application begins (e.g., via control circuitry 604 (FIG. 6)) a process for determining a subset of results to display. For example, the media guidance application may initialize the necessary variables and execute (e.g., via control circuitry 604 (FIG. 6)) a program script calling a particular method to execute process 1000.

Process 1000 continues to 1004, where the media guidance application determines (e.g., via control circuitry 604 (FIG. 6)) if the results are ranked based on relevance to user input. For example, the media guidance application may determine (e.g., via control circuitry 604 (FIG. 6)) whether data received with search results from the source (e.g., via content source 716 (FIG. 7)) indicates that the results are ranked based on relevance to user input. As a specific example, the media guidance application may determine (e.g., via control circuitry 604 (FIG. 6)) whether a boolean value is set to "true" for ranking by relevance received in a data packet associated with the results from the source.

If, at 1004, the media guidance application determines that the results are not ranked based on relevance to user input, process 1000 continues to 1006, where the media guidance application compares (e.g., via control circuitry 604 (FIG. 6)) each result to the user input to determine a relevance value. For example, the media guidance application may compare (e.g., via control circuitry 604 (FIG. 6)) characters of a result to the user input to determine an amount and/or percentage that match and assign a relevance value according to the amount and/or percentage that match. Alternatively or additionally, the media guidance application may weigh (e.g., via control circuitry 604 (FIG. 6)) the position that consecutive characters (e.g., a word) match between the user input and the result. For example, if the first word of one result matches the user input and a second result matches the word as well but it is the third word in a string of words, the first result may be assigned a greater relevance value.

Process 1000 continues to 1008, where the media guidance application ranks (e.g., via control circuitry 604 (FIG. 6)) the results based on the relevance value. For example, the media guidance application may order (e.g., via control circuitry 604 (FIG. 6)) the results based on the relevance values (e.g., from highest to lowest relevance) by utilizing a sorting algorithm, such as merge sort or bubble sort. The media guidance application may combine (e.g., via control circuitry 604 (FIG. 6)) the ranking with other rankings and weight each ranking (e.g., based on popularity or user preferences, as discussed below) to generate an aggregate ranking, which is then used to select results for the subset. Process 1000 then continues to 1010.

If, at 1004, the media guidance application determines that the results are ranked based on relevance to user input, process 1000 continues to 1010, where the media guidance application determines (e.g., via control circuitry 604 (FIG. 6)) whether the results are ranked based on popularity. For example, the media guidance application may determine (e.g., via control circuitry 604 (FIG. 6)) whether data received with search results from the source (e.g., via content source 716 (FIG. 7)) indicates that the results are ranked based on popularity. As a specific example, the media guidance application may determine (e.g., via control circuitry 604 (FIG. 6)) whether a boolean value is set to "true" for ranking by popularity received in a data packet associated with the results from the source.

If, at 1010, the media guidance application determines that the results are not ranked based on popularity, process 1000 continues to 1012, where the media guidance application retrieves (e.g., via control circuitry 604 (FIG. 6)) a popularity value for each result. For example, the media guidance application may transmit (e.g., via control circuitry 604 (FIG. 6)) a request for a popularity value associated with an identifier of each result to a database (e.g., to media guidance data source 718 (FIG. 7)). As a specific example, the media guidance application may retrieve (e.g., via control circuitry 604 (FIG. 6)) popularity values from the database. The popularity values may be rankings of how many users view or access data associated with the result (e.g., "The Big Bang Theory" is the number one ranked show, ESPN.com is the $3^{rd}$ most visited webpage, etc.).

Process 1000 continues to 1014, where the media guidance application ranks (e.g., via control circuitry 604 (FIG. 6)) the results based on the retrieved popularity value. For example, the media guidance application may order (e.g., via control circuitry 604 (FIG. 6)) the results based on the popularity values (e.g., from highest to lowest popularity) by utilizing a sorting algorithm, such as merge sort or bubble sort. The media guidance application may combine (e.g., via control circuitry 604 (FIG. 6)) the ranking with other rankings and weight each ranking (e.g., based on popularity or user preferences, as discussed) to generate an aggregate ranking, which is then used to select results for the subset. Process 1000 then continues to 1016.

If, at 1010, the media guidance application determines that the results are ranked based on popularity, process 1000 continues to 1016, where the media guidance application determines (e.g., via control circuitry 604 (FIG. 6)) whether the results are ranked based on user preferences. For example, the media guidance application may determine (e.g., via control circuitry 604 (FIG. 6)) whether data received with search results from the source (e.g., via content source 716 (FIG. 7)) indicates that the results are ranked based on user preferences. As a specific example, the media guidance application may determine (e.g., via control circuitry 604 (FIG. 6)) whether a boolean value is set to "true" for ranking by user preferences received in a data packet associated with the results from the source. For example, the media guidance application may transmit (e.g., via control circuitry 604 (FIG. 6)) user preferences with the user input to the source at the time of the search, or may (e.g., due to data privacy considerations) sort the results based on user preferences after receiving the results.

If, at 1016, the media guidance application determines that the results are not ranked based on user preferences, process 1000 continues to 1018, where the media guidance application retrieves (e.g., via control circuitry 604 (FIG. 6)) user preferences from a user profile. For example, the media guidance application may execute (e.g., via control circuitry 604 (FIG. 6)) a program script utilizing a database query language such as SQL to access and retrieve data in a particular field of the user profile. The media guidance application may retrieve (e.g., via control circuitry 604 (FIG. 6)) data from specific fields (e.g., determined to be relevant to search results, such as a favorite show associated with the user), a random subset of user preferences, or all user preferences from the user profile.

Process 1000 continues to 1020, where the media guidance application compares (e.g., via control circuitry 604

(FIG. 6)) each retrieved user preference to each result to determine a preference value. For example, the media guidance application may compare (e.g., via control circuitry 604 (FIG. 6)) a retrieved user preference with a rule-set for determining whether the user preference relates to a search result. For example, the rule-set may include a rule that if a search result is associated with a particular actor (e.g., Tom Hanks) and the user preference is related to a movie that Tom Hanks is in (e.g., "Forrest Gump') then a specific value will be assigned as the preference value. The media guidance application may update (e.g., via control circuitry 604 (FIG. 6)) the preference value if additional user preferences relate to the same search result.

Process 1000 continues to 1014, where the media guidance application ranks (e.g., via control circuitry 604 (FIG. 6)) the results based on the preference value. Process 1000 then continues to 1024. For example, the media guidance application may order (e.g., via control circuitry 604 (FIG. 6)) the results based on the preference values (e.g., from highest to lowest popularity) by utilizing a sorting algorithm, such as merge sort or bubble sort. The media guidance application may combine (e.g., via control circuitry 604 (FIG. 6)) the ranking with other rankings and weight each ranking (e.g., based on popularity or user preferences, as discussed) to generate an aggregate ranking, which is then used to select results for the subset.

If, at 1016, the media guidance application determines that the results are ranked based on user preferences, process 1000 continues to 1024, where the media guidance application determines (e.g., via control circuitry 604 (FIG. 6)) a row where the results from the source will be displayed. For example, the media guidance application may determine (e.g., via control circuitry 604 (FIG. 6)) a particular location (e.g., a row) to generate results from the first source in. In some embodiments, the row may be located at a row closer to the top of the screen than a second row where results from the second source are presented.

Process 1000 continues to 1026, where the media guidance application determines (e.g., via control circuitry 604 (FIG. 6)) a number of results that fit in the determined row. For example, the media guidance application may determine (e.g., via control circuitry 604 (FIG. 6)) a number of results that fit in the row based on retrieving a value from a display template, as discussed above with respect to FIG. 1. The number may be constant (e.g., each row always contains 3 results) or may vary based on the length of identifiers of the results (e.g., results with a large number of characters take up more space and fewer can be displayed at once).

Process 1000 continues to 1028, where the media guidance application selects (e.g., via control circuitry 604 (FIG. 6)) the number of results from the ranked results as the subset of results to display. For example, the media guidance application may then select the appropriate number of results from the received search results from the source to display (e.g., the subset), as described further with respect to FIGS. 1-2.

Figure 11:
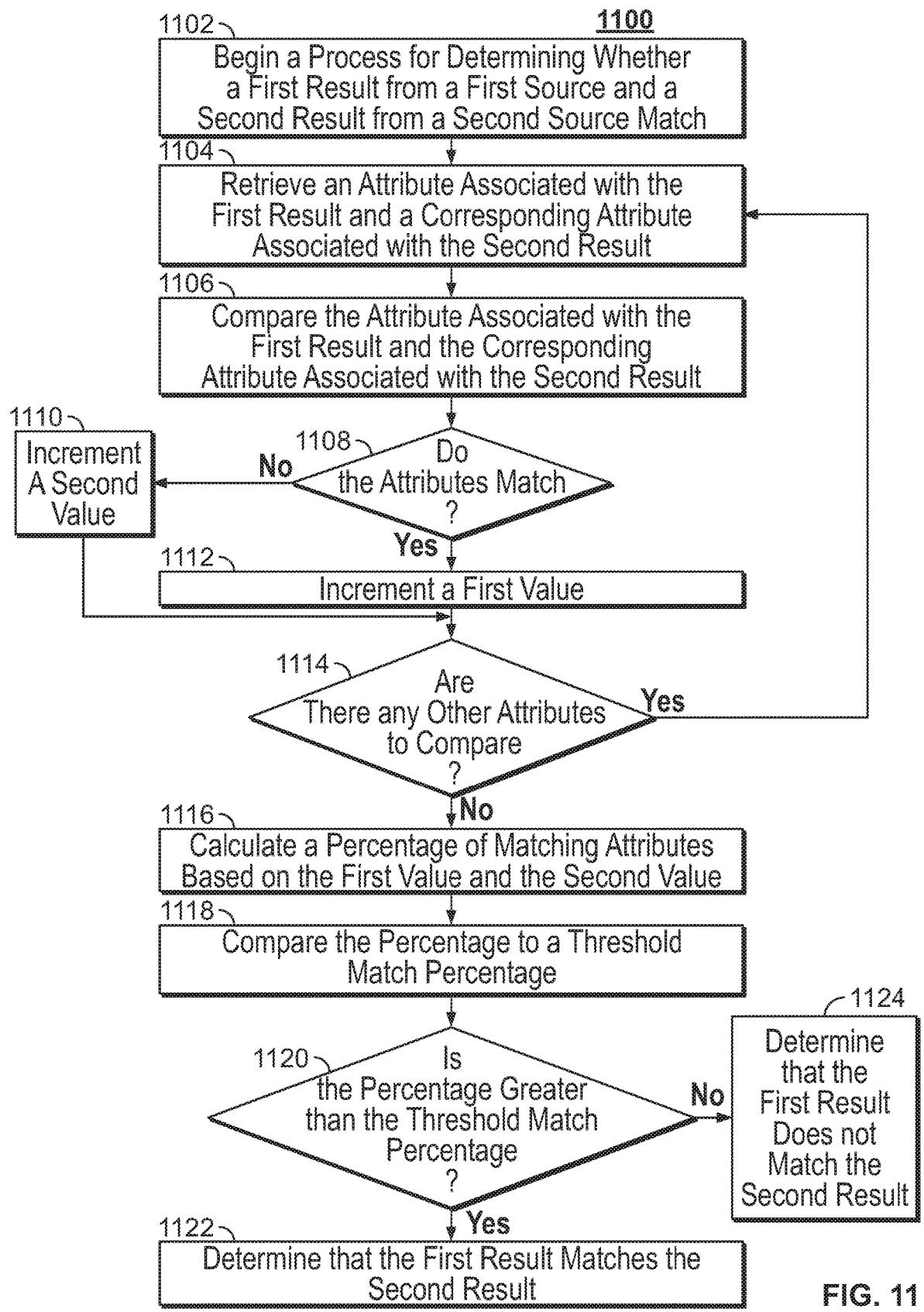
FIG. 11 is a flowchart of illustrative steps for determining whether a first result from a first source and a second result from a second source match, in accordance with some embodiments of the disclosure.

FIG. 11 is a flowchart of illustrative steps for determining whether a first result from a first source and a second result from a second source match, in accordance with some embodiments of the disclosure. For example, a media guidance application implementing process 1100 may be executed by control circuitry 604 (FIG. 6). It should be noted that process 1100 or any step thereof could be performed on, or provided by, any of the devices shown in FIGS. 6-7. Process 1100 starts at 1102, where the media guidance application begins (e.g., via control circuitry 604 (FIG. 6)) a process for determining whether a first result from a first source and a second result from a second source match. For example, the media guidance application may initialize the necessary variables and execute (e.g., via control circuitry 604 (FIG. 6)) a program script calling a particular method to execute process 1100.

Process 1100 continues to 1104, where the media guidance application retrieves (e.g., via control circuitry 604 (FIG. 6)) an attribute associated with the first result and a corresponding attribute associated with the second result. For example, the media guidance application may retrieve (e.g., via control circuitry 604 (FIG. 6)) tables containing metadata associated with the first and second results stored locally (e.g., in storage 608 (FIG. 6)) or remotely at a server (e.g., at media guidance data source 718 accessible via communications network 714 (FIG. 7)). For example, the tables containing metadata associated with each stored identifier may be structured so that metadata in a first field of each table is always a title associated with the result, metadata in a second field of each table is always a director, etc., for easier comparison (e.g., metadata for the same attribute can be compared without having to compare each stored value to every stored value associated with another identifier). Alternatively or additionally, the table may be structured such that each field with metadata is associated with a label, such as "ACTOR," which can be used to compare corresponding metadata associated with different identifiers. The media guidance application may retrieve (e.g., via control circuitry 604 (FIG. 6)) metadata from a first field associated with the first result (e.g., a title) and metadata from a second field associated with the second result (e.g., also a title).

Process 1100 continues to 1106, where the media guidance application compares (e.g., via control circuitry 604 (FIG. 6)) the attribute associated with the first result and the corresponding attribute associated with the second result. For example, the media guidance application may compare (e.g., via control circuitry 604 (FIG. 6)) each character of a retrieved string of characters associated with the first result (e.g., a title) with characters of a retrieved string of characters associated with the second result (e.g., another title). For example, the media guidance application may execute (e.g., via control circuitry 604 (FIG. 6)) a program script to iteratively compare characters of metadata (e.g., attributes) of two results to determine whether the two results match. For example, the media guidance application may compare (e.g., via control circuitry 604 (FIG. 6)) the string of characters "Matt Damon," associated with the first result, with the string of characters "Matt Dillon," associated with the second result.

Process 1100 continues to 1108, where the media guidance application determines (e.g., via control circuitry 604 (FIG. 6)) if the attributes match. For example, the media guidance application may determine (e.g., via control circuitry 604 (FIG. 6)) whether two attributes match if all the characters match. Alternatively or additionally, the media guidance application may determine (e.g., via control circuitry 604 (FIG. 6)) whether two attributes match if a threshold amount or percentage of all the characters of two attributes match. For example, in some instances due to spelling errors or other typographical mistakes, a single character may be different between metadata associated with the first result and metadata associated with the second result (e.g., "Tom Hanks" and "Tom Hankz") and the media guidance application may still determine (e.g., via control circuitry 604 (FIG. 6)) a match.

If, at 1108, the media guidance application determines that the attributes do not match, process 1100 continues to

1110, where the media guidance application increments (e.g., via control circuitry 604 (FIG. 6)) a second value. For example, the media guidance application may initialize (e.g., via control circuitry 604 (FIG. 6)) a variable storing an integer and increment the value every time a match is not determined between two corresponding attributes. For example, the media guidance application may determine (e.g., via control circuitry 604 (FIG. 6)) that "Tom Hanks" associated with the first result does not match "Chris Evans" associated with the second result and thus increments the variable by one. If, at 1108, the media guidance application determines that the attributes do match, process 1100 continues to 1112, where the media guidance application increments (e.g., via control circuitry 604 (FIG. 6)) a first value. For example, the media guidance application may initialize (e.g., via control circuitry 604 (FIG. 6)) a variable storing an integer and increment the value every time a match is determined between two corresponding attributes. For example, the media guidance application may determine (e.g., via control circuitry 604 (FIG. 6)) that "Tom Hanks" associated with the first result matches "Tom Hankz" associated with the second result and thus increments the variable by one.

Process 1100 continues to 1114, where the media guidance application determines (e.g., via control circuitry 604 (FIG. 6)) if there are any other attributes to compare. For example, the media guidance application may execute a for-loop to iteratively retrieve every attribute associated with the first result and compare to a corresponding attribute associated with the second result (e.g., which is also retrieved). The media guidance application may determine (e.g., via control circuitry 604 (FIG. 6)) that data in some fields of a table storing metadata associated with a result has not been retrieved based on the for-loop still running. The media guidance application may also store (e.g., via control circuitry 604 (FIG. 6)) a list of attributes or identifiers of attributes that have been retrieved and compare with stored attributes associated with a result to determine if there are any other attributes that have not yet been retrieved.

If, at 1114, the media guidance application determines that there are other attributes to compare, process 1100 returns to 1104, where the media guidance application retrieves (e.g., via control circuitry 604 (FIG. 6)) an attribute associated with the first result and a corresponding attribute associated with the second result. For example, the media guidance application may determine (e.g., via control circuitry 604 (FIG. 6)) that some attributes have not yet been retrieved from a data structure or data structures with attributes associated with the first and second results and the media guidance application may continue (e.g., via control circuitry 604 (FIG. 6)) to retrieve attributes until all have been compared.

If, at 1114, the media guidance application determines that there are not any other attributes to compare, process 1100 continues to 1116, where the media guidance application calculates (e.g., via control circuitry 604 (FIG. 6)) a percentage of matching attributes based on the first value and the second value. For example, the media guidance application may calculate (e.g., via control circuitry 604 (FIG. 6)) a total number of attributes (e.g., by adding the first value to the second value or by retrieving the total number from a data structure storing attributes). The media guidance application may then calculate (e.g., via control circuitry 604 (FIG. 6)) the percentage of matching attributes by dividing the total number by the first value. As a specific example, if there are 10 matches (e.g., the first value is 10) and 5 non-matches (e.g., the second value is 5), then the media guidance application may calculate (e.g., via control circuitry 604 (FIG. 6)) the total number as 15 and the percentage as 10/15, or 67%.

Process 1100 continues to 1118, where the media guidance application compares (e.g., via control circuitry 604 (FIG. 6)) the percentage to a threshold match percentage. For example, the media guidance application may retrieve (e.g., via control circuitry 604 (FIG. 6)) a stored value (e.g., from storage 608 (FIG. 6)) for the threshold match percentage. The media guidance application may then compare (e.g., via control circuitry 604 (FIG. 6)) the calculated percentage of attributes that match between two results to the retrieved threshold.

Process 1100 continues to 1120, where the media guidance application determines (e.g., via control circuitry 604 (FIG. 6)) if the percentage is greater than the threshold match percentage. For example, the media guidance application may determine (e.g., via control circuitry 604 (FIG. 6)) that if the value for the percentage of attributes is 67% and the value for the threshold for determining a match is 50% that the two results match. The media guidance application may still determine (e.g., via control circuitry 604 (FIG. 6)) a match if the percentage is within a tolerance factor (e.g., if the percentage of attributes that match is only 2% below the threshold for determining a match). In some embodiments, the tolerance factor may be based on the number of attributes that were compared.

If, at 1120, the media guidance application determines that the percentage is greater than the threshold match percentage, then process 1100 continues to 1122, where the media guidance application determines (e.g., via control circuitry 604 (FIG. 6)) that the first result matches the second result. For example, the media guidance application may determine (e.g., via control circuitry 604 (FIG. 6)) that, since the value for the calculated percentage is greater than the threshold value, the two results match. As described above with respect to FIGS. 1-2 and 8, the media guidance application may determine (e.g., via control circuitry 604 (FIG. 6)) to remove one of the two results from a subset to be displayed based on what the user's preferences are for the two sources of the two identical results. If, at 1120, the media guidance application determines that the percentage is not greater than the threshold match percentage, then process 1100 continues to 1124, where the media guidance application determines (e.g., via control circuitry 604 (FIG. 6)) that the first result does not match the second result. For example, the media guidance application may determine (e.g., via control circuitry 604 (FIG. 6)) that, since the value for the calculated percentage is less than the threshold value, the two results do not match.

Figure 12:
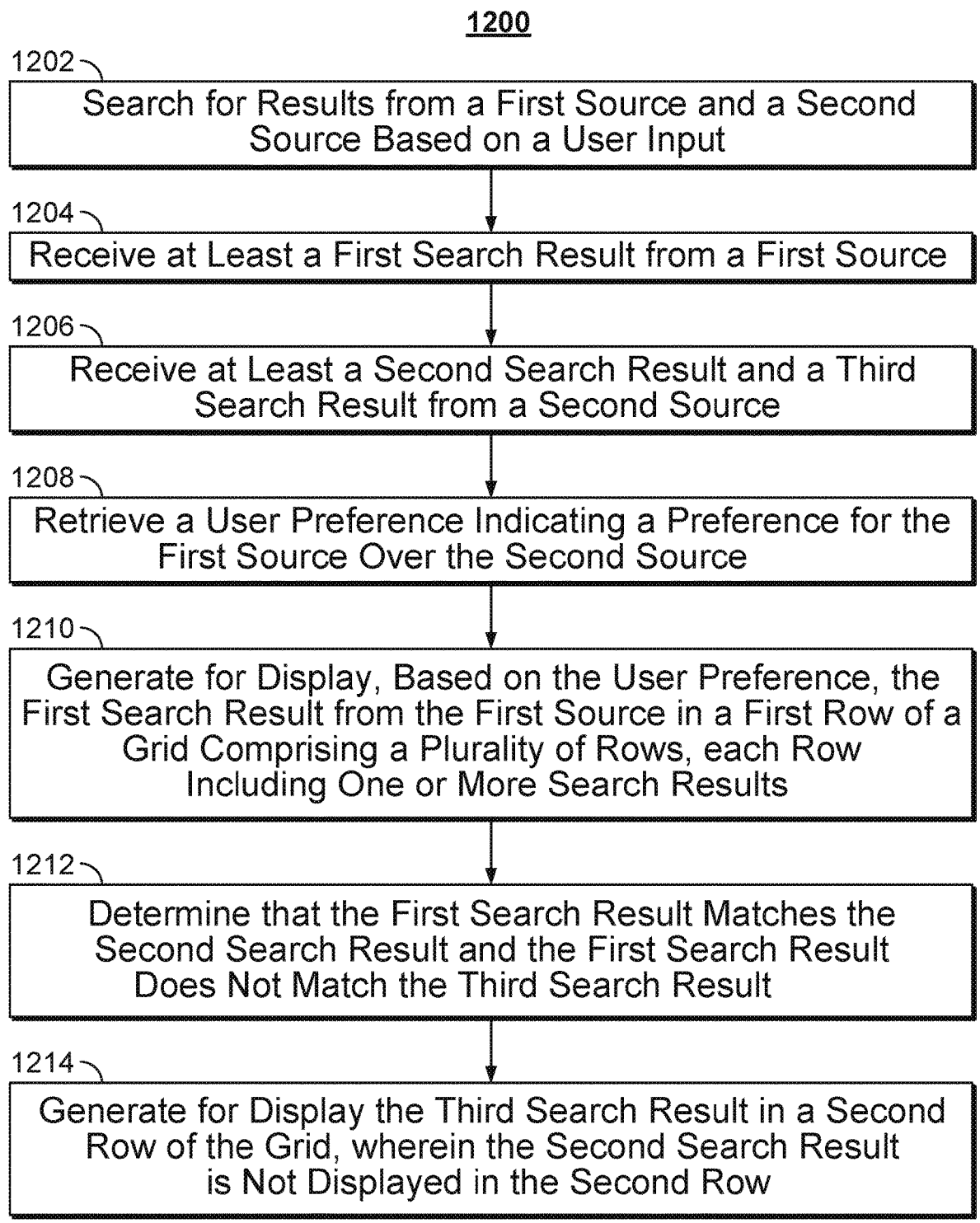
FIG. 12 is another flowchart of illustrative steps for presenting search results from a plurality of sources, in accordance with some embodiments of the disclosure.

FIG. 12 is another flowchart of illustrative steps for presenting search results from a plurality of sources, in accordance with some embodiments of the disclosure. For example, a media guidance application implementing process 1200 may be executed by control circuitry 604 (FIG. 6). It should be noted that process 1200 or any step thereof could be performed on, or provided by, any of the devices shown in FIGS. 6-7.

Process 1200 begins at 1202, where the media guidance application searches (e.g., via control circuitry 604 (FIG. 6)) for results from a first source and a second source based on a user input. For example, the media guidance application may receive (e.g., via control circuitry 604 (FIG. 6)) a user input via a user input interface (e.g., user input interface 610 (FIG. 6)). For example, the media guidance application may transmit (e.g., via control circuitry 604 (FIG. 6)) the user input to the first source and the second source (e.g., to content source 716 via communications network 714 (FIG. 7)). For example, the media guidance application may generate a data packet including the user input (e.g., a string of characters) and/or other parameters for the search (e.g., results should be during a certain time period). In some embodiments, the media guidance application may utilize an API from one or both of the sources to transmit (e.g., via control circuitry 604 (FIG. 6)) a search query (e.g., based on the user input).

Process 1200 continues to 1204, where the media guidance application receives (e.g., via control circuitry 604 (FIG. 6)) at least a first search result from a first source. For example, the media guidance application may receive (e.g., via control circuitry 604 (FIG. 6)) one or more results that match the user input from the first source (e.g., from content source 716 (FIG. 7)). The result(s) from the source may be received (e.g., via control circuitry 604 (FIG. 6)) by the media guidance application in a table, where the table contains a plurality of rows, each with an identifier of a matching result (e.g., the title of a media asset) and additional information in associated fields (e.g., an actor in a media asset).

Process 1200 continues to 1206, where the media guidance application receives (e.g., via control circuitry 604 (FIG. 6)) at least a second search result and a third search result from a second source. For example, the media guidance application may receive (e.g., via control circuitry 604 (FIG. 6)) a plurality of results that match the user input from the second source (e.g., from content source 716 (FIG. 7)). The results from the second source may be received (e.g., via control circuitry 604 (FIG. 6)) by the media guidance application in a table, where the table contains a plurality of rows, each with an identifier of a matching result (e.g., the title of a media asset) and additional information in associated fields (e.g., an actor in a media asset).

Process 1200 continues to 1208, where the media guidance application retrieves (e.g., via control circuitry 604 (FIG. 6)) a user preference indicating a preference for the first source over the second source. For example, the media guidance application may retrieve (e.g., via control circuitry 604 (FIG. 6)) a user profile stored locally (e.g., in storage 608 (FIG. 6)) or remotely at a server (e.g., at media guidance data source 718 accessible via communications network 714 (FIG. 7)). The media guidance application may retrieve (e.g., via control circuitry 604 (FIG. 6)) search preferences from the user profile, as described further below with respect to FIG. 9. For example, the media guidance application may store (e.g., via control circuitry 604 (FIG. 6)) a ranking of sources set by the user. As a specific example, the media guidance application may generate a graphical user interface (e.g., on display 612 (FIG. 6)) where the user can drag and drop sources (e.g., HULU®, AMAZON®, etc.) into a particular order to reflect his or her preferences. The media guidance application may then store (e.g., in an array) the rank and an identifier of each source. The media guidance application may retrieve (e.g., via control circuitry 604 (FIG. 6)) the stored ranks of sources set by the user and determine respective ranks of the first and second sources. For example, the media guidance application may determine (e.g., via control circuitry 604 (FIG. 6)) that HULU®, identified by the string of characters "hulu", is associated with a ranking of "5". If the ranking for AMAZON® is "3", the media guidance application may determine (e.g., via control circuitry 604 (FIG. 6)) that the user prefers AMAZON® to HULU®.

Process 1200 continues to 1210, where the media guidance application generates (e.g., via control circuitry 604 (FIG. 6)) for display, based on the user preference, the first search result from the first source in a first row of a grid comprising a plurality of rows, each row including one or more search results. For example, the media guidance application may determine (e.g., via control circuitry 604 (FIG. 6)) a particular location (e.g., a row) to generate results from the first source in. For example, the media guidance application may generate (e.g., via control circuitry 604 (FIG. 6)) for display (e.g., on display 612 (FIG. 6)) an indicator associated with the first result (e.g., text and/or graphics) in the first row. In some embodiments, the row may be located at a row closer to the top of the screen (e.g., display 612 (FIG. 6)) than a second row where results from the second source are presented.

Process 1200 continues to 1212, where the media guidance application determines (e.g., via control circuitry 604 (FIG. 6)) that the first search result matches the second search result and the first search result does not match the third search result. For example, the media guidance application may determine (e.g., via control circuitry 604 (FIG. 6)) that if each character of a specific attribute associated with the first result matches each character of the corresponding attribute associated with the second result that the two results match. For example, if two results contain metadata referring to actor "Matt Damon," the media guidance application may determine (e.g., via control circuitry 604 (FIG. 6)) the metadata matches and thus the two results match.

Process 1200 continues to 1214, where the media guidance application generates (e.g., via control circuitry 604 (FIG. 6)) for display the third search result in a second row of the grid, wherein the second search result is not displayed in the second row. For example, upon determining that two results that are to be displayed at the same time match (e.g., they are in the first and second subsets), the media guidance application replaces (e.g., via control circuitry 604 (FIG. 6)) the result of the source that the user does not prefer with another result. For example, if "The Big Bang Theory" is a result from both the first and second sources (e.g., source 716 (FIG. 7)) and in the first and second subsets, the second result in the second subset may be replaced with another result (e.g., the third result). The media guidance application may then generate (e.g., via control circuitry 604 (FIG. 6)) for display (e.g., on display 612 (FIG. 6)) the third result instead of the second result in the second row (e.g., with results from the second source).

It is contemplated that the steps or descriptions of each of FIGS. 8-12 may be used with any other embodiment of this disclosure. In addition, the steps and descriptions described in relation to FIGS. 8-12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 6-7 could be used to perform one or more of the steps in FIGS. 8-12.

While some portions of this disclosure may make reference to "convention," any such reference is merely for the purpose of providing context to the invention(s) of the instant disclosure, and does not form any admission as to what constitutes the state of the art.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for presenting search results from a plurality of sources, the method comprising:
   receiving a user input;
   searching for results from a first source and a second source based on the user input, the first source and the second source selected from a plurality of sources;
   receiving first search results from the first source and second search results from the second source;
   retrieving a user preference indicating a rank for each source of the plurality of sources;
   generating for display a grid comprising a plurality of rows;
   in response to determining that a rank of the first source is higher than a rank of the second source, generating for display the first search results from the first source in a first row and the second search results from the second source in a second row below the first row;
   determining a first subset of the first search results that fit in the first row and a second subset of the second search results that fit in a second row, wherein the first subset includes a first result of the first search results, and wherein the second subset includes a second result but not a third result of the second search results;
   comparing metadata associated with the first result with metadata associated with the second result;
   determining, based on the comparing, that the first result matches the second result;
   in response to determining that the first result matches the second result, modifying the second subset by replacing the second result in the second subset with the third result; and
   generating for display the first subset in the first row and the modified second subset in the second row.

2. The method of claim 1, wherein the user input is a first user input, and wherein the preference is a first preference, further comprising:
   receiving a second user input indicating a second preference for the second source over the first source; and
   in response to receiving the second user input:
      generating a third subset of the second search results by replacing the third result in the modified second subset with the second result;
      generating a fourth subset of the first search results by replacing the first result in the first subset with a fourth result of the first search results, wherein the fourth result is not in the first subset; and
      generating for display the third subset in the first row instead of the first subset and the fourth subset in the second row instead of the modified second subset.

3. The method of claim 1, wherein determining the first subset of the first search results that fit in the first row and the second subset of the second search results that fit in the second row comprises:
   retrieving a display template for the grid;
   retrieving, from a first field of the display template associated with the first row, a first value for a first number of results that fit in the first row;
   retrieving, from a second field of the display template associated with the second row, a second value for a second number of results that fit in the second row;
   selecting the first number of results from the first search results as the first subset; and
   selecting the second number of results from the second search results as the second subset.

4. The method of claim 1, wherein determining the first subset of the first search results that fit in the first row and the second subset of the second search results that fit in the second row comprises:
   ranking each result in the first search results and each result in the second search results based on a relevance of each result to the user input;
   retrieving a highest ranked result in the first search results as the first result in the first subset; and
   retrieving a highest ranked result in the second search results as the second result in the second subset.

5. The method of claim 1, wherein modifying the second subset by replacing the second result in the second subset with the third result comprises:
   retrieving a next highest ranked result not in the second subset as the third result;
   removing the second result from the second subset; and
   adding the third result to the second subset.

6. The method of claim 1, wherein the user preference is a first user preference, and wherein modifying the second subset by replacing the second result in the second subset with the third result comprises:
   retrieving a second user preference for an attribute of search results;
   determining that an attribute of the third result matches the second user preference; and
   in response to determining that the attribute of the third result matches the second user preference:
      removing the second result from the second subset; and
      adding the third result to the second subset.

7. The method of claim 1, wherein comparing the metadata associated with the first result with the metadata associated with the second result comprises:
   comparing a first identifier of the first result and a second identifier of the second result with a plurality of identifiers stored in a database;
   determining that a first stored identifier matches the first identifier and a second stored identifier matches the second identifier;
   retrieving first metadata from a first field associated with the first stored identifier and second metadata from a second field associated with the second stored identifier; and
   comparing first characters of the first metadata associated with the first result with second characters of the second metadata associated with the second result.

8. The method of claim 1, wherein generating for display the grid further comprises:
   comparing each result of the first search results with each result of the second search results;
   determining, based on comparing each result of the first search results with each result of the second search results, a number of duplicate results between the first search results and the second search results; and
   generating for display an indication of the number of duplicate results in the second row.

9. The method of claim 1, further comprising:
receiving a user selection of the first result; and
in response to receiving the user selection, generating for display an indication that the first result is also available from the second source.

10. The method of claim 1, wherein the first result identifies a media asset, further comprising:
receiving a user selection of the first result;
in response to receiving the user selection, generating for display a plurality of selectable options associated with the media asset, wherein the plurality of selectable options include at least one of:
an option to add the media asset to a watch list;
an option to add the media asset to a favorites list;
an option to view upcoming times the media asset is available; and
an option to record the media asset.

11. A system for presenting search results from a plurality of sources, the system comprising:
user input circuitry; and
control circuitry configured to:
receive, via the user input circuitry, a user input;
search for results from a first source and a second source based on the user input, the first source and the second source selected from a plurality of source;
receive first search results from the first source and second search results from the second source;
retrieve a user preference indicating a rank for each source of the plurality of sources;
generate for display a grid comprising a plurality of rows;
generate for display, in response to determining that a rank of the first source is higher than a rank of the second source, the first search results from the first source in a first row and the second search results from the second source in a second row below the first row;
determine a first subset of the first search results that fit in the first row and a second subset of the second search results that fit in a second row, wherein the first subset includes a first result of the first search results, and wherein the second subset includes a second result but not a third result of the second search results;
compare metadata associated with the first result with metadata associated with the second result;
determine, based on the comparing, that the first result matches the second result;
in response to determining that the first result matches the second result, modify the second subset by replacing the second result in the second subset with the third result; and
generate for display the first subset in the first row and the modified second subset in the second row.

12. The system of claim 11, wherein the user input is a first user input, and wherein the preference is a first preference, the control circuitry further configured to:
receive a second user input indicating a second preference for the second source over the first source; and
in response to receiving the second user input:
generate a third subset of the second search results by replacing the third result in the modified second subset with the second result;
generate a fourth subset of the first search results by replacing the first result in the first subset with a fourth result of the first search results, wherein the fourth result is not in the first subset; and
generate for display the third subset in the first row instead of the first subset and the fourth subset in the second row instead of the modified second subset.

13. The system of claim 11, wherein the control circuitry is further configured, when determining the first subset of the first search results that fit in the first row and the second subset of the second search results that fit in the second row, to:
retrieve a display template for the grid;
retrieve, from a first field of the display template associated with the first row, a first value for a first number of results that fit in the first row;
retrieve, from a second field of the display template associated with the second row, a second value for a second number of results that fit in the second row;
select the first number of results from the first search results as the first subset; and
select the second number of results from the second search results as the second subset.

14. The system of claim 11, wherein the control circuitry is further configured, when determining the first subset of the first search results that fit in the first row and the second subset of the second search results that fit in the second row, to:
rank each result in the first search results and each result in the second search results based on a relevance of each result to the user input;
retrieve a highest ranked result in the first search results as the first result in the first subset; and
retrieve a highest ranked result in the second search results as the second result in the second subset.

15. The system of claim 11, wherein the control circuitry is further configured, when modifying the second subset by replacing the second result in the second subset with the third result, to:
retrieve a next highest ranked result not in the second subset as the third result;
remove the second result from the second subset; and
add the third result to the second subset.

16. The system of claim 11, wherein the user preference is a first user preference, and wherein the control circuitry is further configured, when modifying the second subset by replacing the second result in the second subset with the third result, to:
retrieve a second user preference for an attribute of search results;
determine that an attribute of the third result matches the second user preference; and
in response to determining that the attribute of the third result matches the second user preference:
remove the second result from the second subset; and
add the third result to the second subset.

17. The system of claim 11, wherein the control circuitry is further configured, when comparing the metadata associated with the first result with the metadata associated with the second result, to:
compare a first identifier of the first result and a second identifier of the second result with a plurality of identifiers stored in a database;
determine that a first stored identifier matches the first identifier and a second stored identifier matches the second identifier;
retrieve first metadata from a first field associated with the first stored identifier and second metadata from a second field associated with the second stored identifier; and compare first characters of the first metadata associated with the first result with second characters of the second metadata associated with the second result.

18. The system of claim 11, wherein the control circuitry is further configured, when generating for display the grid, to:
  compare each result of the first search results with each result of the second search results;
  determine, based on comparing each result of the first search results with each result of the second search results, a number of duplicate results between the first search results and the second search results; and
  generate for display an indication of the number of duplicate results in the second row.

19. The system of claim 11, wherein the control circuitry is further configured to:
  receive a user selection of the first result; and
  in response to receiving the user selection, generate for display an indication that the first result is also available from the second source.

20. The system of claim 11, wherein the first result identifies a media asset, and wherein the control circuitry is further configured to:
  receive a user selection of the first result;
  in response to receiving the user selection, generate for display a plurality of selectable options associated with the media asset, wherein the plurality of selectable options include at least one of:
    an option to add the media asset to a watch list;
    an option to add the media asset to a favorites list;
    an option to view upcoming times the media asset is available; and
    an option to record the media asset.

* * * * *